US012651291B2

(12) United States Patent
Florenzano et al.

(10) Patent No.: US 12,651,291 B2
(45) Date of Patent: Jun. 9, 2026

(54) SYSTEMS AND METHODS FOR GENERATING AUGMENTED REALITY WITHIN A SUBSPACE

(71) Applicant: SHOPIFY INC., Ottawa (CA)

(72) Inventors: Eric Andrew Florenzano, San Francisco, CA (US); James Harold Hall, Jr., Atlanta, GA (US); Russ Maschmeyer, Berkeley, CA (US); Adam Debreczeni, Bozeman, MT (US); Daniel Beauchamp, Toronto (CA)

(73) Assignee: SHOPIFY INC., Ottawa (CA)

( * ) Notice: Subject to any disclaimer, the term of this patent is extended or adjusted under 35 U.S.C. 154(b) by 474 days.

(21) Appl. No.: 17/749,544

(22) Filed: May 20, 2022

(65) Prior Publication Data

US 2023/0377027 A1 Nov. 23, 2023

(51) Int. Cl.
*G06Q 30/00* (2023.01)
*G06Q 30/0601* (2023.01)

(52) U.S. Cl.
CPC ................................ *G06Q 30/0643* (2013.01)

(58) Field of Classification Search
CPC ........... G06Q 30/0601; G06Q 30/0631; G06Q 30/0641; G06Q 30/0643
See application file for complete search history.

(56) References Cited

U.S. PATENT DOCUMENTS

| 12,141,929 | B1 * | 11/2024 | Yang | G06T 19/20 |
| 2003/0158796 | A1 * | 8/2003 | Balent | G06Q 30/06 |
| | | | | 705/28 |
| 2008/0226119 | A1 * | 9/2008 | Candelore | G06F 16/587 |
| | | | | 382/100 |
| 2008/0279481 | A1 * | 11/2008 | Ando | G06F 16/48 |
| | | | | 705/26.1 |
| 2009/0063307 | A1 * | 3/2009 | Groenovelt | G06Q 10/087 |
| | | | | 705/28 |
| 2009/0128335 | A1 * | 5/2009 | Leung | G06Q 30/0207 |
| | | | | 705/14.1 |

(Continued)

OTHER PUBLICATIONS

Lehtinen, Ville, Antti Nurminen, and Antti Oulasvirta. "Integrating spatial sensing to an interactive mobile 3D map." 2012 IEEE Symposium on 3D User Interfaces (3DUI). IEEE, 2012. (Year: 2012).*

(Continued)

*Primary Examiner* — Christopher B Seibert

(57) ABSTRACT

In an augmented reality (AR) experience, virtual content may be rendered at a particular position within a 3D spatial map and overlaid onto a view of the real-world space. There may be scenarios in which the user wants to limit a 3D model to being rendered within a particular subspace of the space defined by the 3D spatial map. Computer-implemented methods are disclosed that include receiving input defining a subspace of a 3D spatial map of a real-world space. A set of 3D models may then be filtered to identify a subset of the 3D models that fit within the subspace defined by the input. AR content including a render of a particular 3D model from the subset and overlaid onto a view of the real-world space in a position within the subspace may be output for display.

20 Claims, 16 Drawing Sheets

(56) References Cited

U.S. PATENT DOCUMENTS

| | | | | |
|---|---|---|---|---|
| 2010/0046842 A1* | 2/2010 | Conwell | ................. | G06F 18/24 |
| | | | | 382/218 |
| 2011/0221657 A1* | 9/2011 | Haddick | ........... | G06Q 30/0261 |
| | | | | 359/554 |
| 2012/0256954 A1* | 10/2012 | Soon-Shiong | ........ | A63F 13/335 |
| | | | | 345/633 |
| 2012/0290366 A1* | 11/2012 | Giles | ...................... | G06Q 40/02 |
| | | | | 705/14.1 |
| 2013/0179303 A1* | 7/2013 | Petrou | ................ | G06Q 30/0623 |
| | | | | 705/26.61 |
| 2014/0028712 A1* | 1/2014 | Keating | ................ | G06T 19/006 |
| | | | | 345/633 |
| 2014/0100996 A1* | 4/2014 | Klein | ........................ | G06T 1/00 |
| | | | | 705/27.2 |
| 2014/0100997 A1* | 4/2014 | Mayerle | ................ | G06T 19/006 |
| | | | | 705/27.2 |
| 2014/0143105 A1* | 5/2014 | Shaw | ................. | G06Q 20/3224 |
| | | | | 705/30 |
| 2014/0152847 A1* | 6/2014 | Zomet | ................ | G06Q 30/0629 |
| | | | | 348/222.1 |
| 2015/0031440 A1* | 1/2015 | Desanti | ................. | A63F 13/822 |
| | | | | 463/25 |
| 2017/0364924 A1* | 12/2017 | Bennett | .................... | G06F 21/10 |
| 2019/0197599 A1* | 6/2019 | Zia | ..................... | G06Q 30/0631 |
| 2020/0051338 A1* | 2/2020 | Zia | ..................... | G06Q 30/0643 |
| 2022/0028174 A1* | 1/2022 | Zia | ..................... | G06Q 30/0641 |
| 2022/0066456 A1* | 3/2022 | Ebrahimi Afrouzi | ........................ | |
| | | | | G06F 3/04883 |
| 2023/0288223 A1* | 9/2023 | Shekar | ................... | G06V 20/56 |
| 2023/0332923 A1* | 10/2023 | Collins | .............. | G06F 16/2219 |

OTHER PUBLICATIONS

Zhu, Yingying, et al. "Complex non-rigid motion 3d reconstruction by union of subspaces." Proceedings of the IEEE conference on computer vision and pattern recognition. 2014. (Year: 2014).*

"Oculus Quest Basics Tutorial Part 02: Play Area Setup", 8 pages of screenshots enclosed. Video uploaded on May 20, 2019 by Meta Quest. Video retrieved online via URL: https://www.youtube.com/watch?v=zh5ldprM5Mg&t=108s.

* cited by examiner

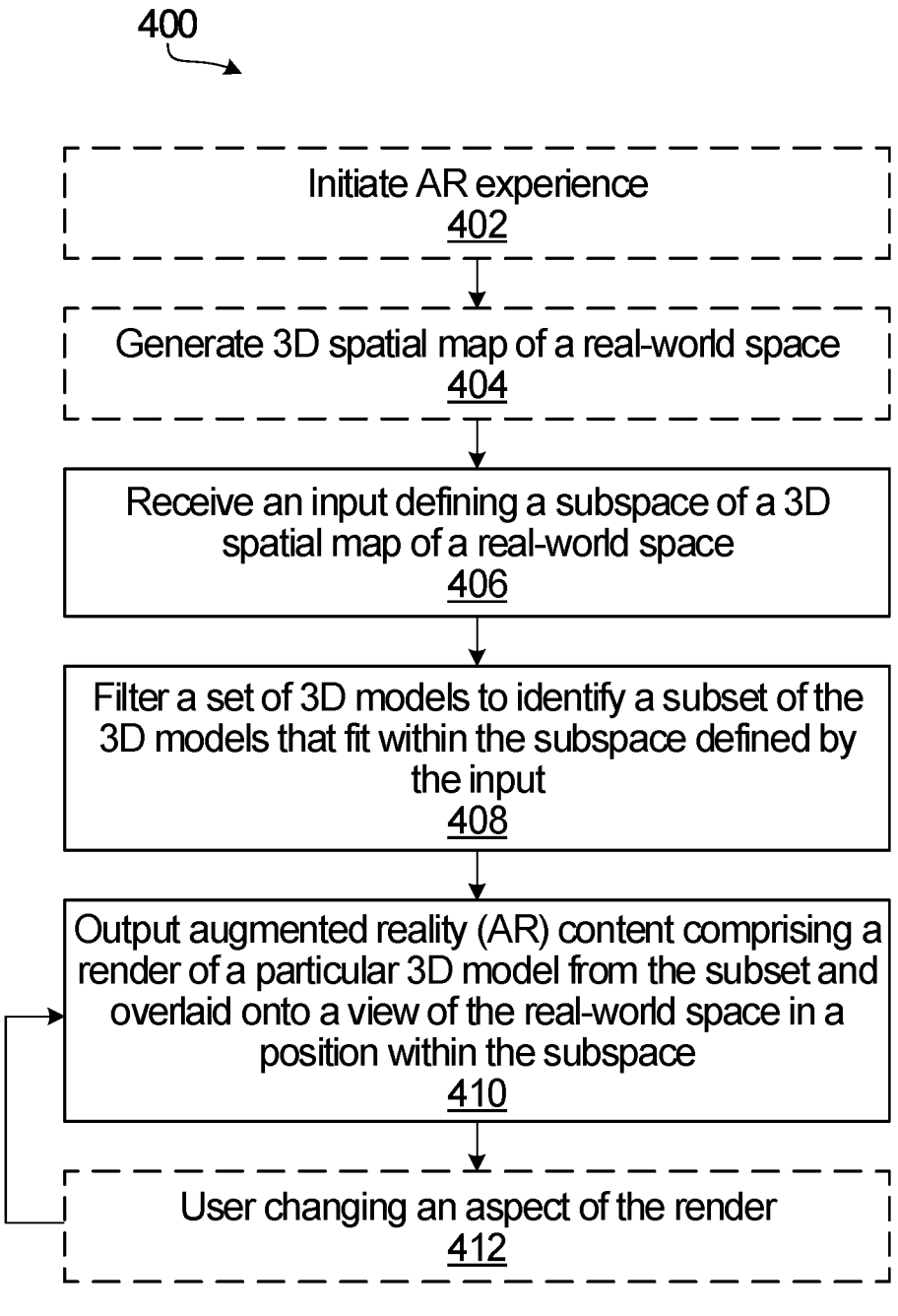

400

Initiate AR experience
402

Generate 3D spatial map of a real-world space
404

Receive an input defining a subspace of a 3D
spatial map of a real-world space
406

Filter a set of 3D models to identify a subset of the
3D models that fit within the subspace defined by
the input
408

Output augmented reality (AR) content comprising a
render of a particular 3D model from the subset and
overlaid onto a view of the real-world space in a
position within the subspace
410

User changing an aspect of the render
412

FIG. 4

SYSTEMS AND METHODS FOR GENERATING AUGMENTED REALITY WITHIN A SUBSPACE

FIELD

The present application relates to augmented reality (AR), and in particular embodiments, to the generation of AR content.

BACKGROUND

AR relates to the enhancement of real-world experiences using computer-generated or virtual content. In some cases, AR involves superimposing virtual content over physical real-world content. This superposition can be either constructive or destructive. Constructive AR adds content to a real-world experience, whereas destructive AR masks content in a real-world experience. In some cases, a given AR experience consists of a combination of constructive and destructive AR. AR differs from virtual reality (VR). VR relates to the creation of a completely virtual experience, whereas AR maintains at least a portion of the real-world experience, but alters the perception of that real-world experience using virtual content. During an AR experience, images of a real-world space captured by a camera are overlaid with virtual content.

SUMMARY

To create an AR experience, a process may be used to determine a three dimensional (3D) spatial map of the real-world space, e.g. Simultaneous Localization and Mapping (SLAM) may be performed. Virtual content may then be overlaid onto a view of the real-world space. The virtual content may include a render of a 3D model at a particular position within the 3D spatial map, e.g. the 3D model may be rendered at a particular location in a virtual coordinate system that is defined using the 3D spatial map. The 3D model has defined dimensions, e.g. a defined length, width and height. When the 3D model is rendered, the size of the rendered model is proportionally scaled based on how far away the 3D model is positioned relative to the user's device.

The 3D spatial map may encompass a volume of the real-world space that is commensurate with or larger than the real-world space viewed through the user's device. However, there may be scenarios in which the user wants to limit a 3D model to being rendered within a particular subspace of the real-world space defined by the 3D spatial map. For example, in an e-commerce application, a user may be having an AR experience in which they are viewing their living room through their user device and placing virtual furniture. Each piece of virtual furniture may be virtual content in the form of a 3D model that is rendered and overlaid over the image of the real-world living room. The 3D model can be anchored to a detected surface of the room, e.g. to a detected floor.

However, the user may have specific requirements that limit the 3D model to a particular subspace of the 3D spatial map of the real-world space. The limitation may span multiple surfaces. For example, in the e-commerce example introduced above, the user may wish to only view furniture that will not block a window and that only takes up a certain proportion of the floor space.

In some embodiments, a user may therefore define a subspace using their user device, e.g. by specifying a boundary via their touchscreen display or using raycasting. Available 3D models may then be filtered to exclude models that, when rendered, do not fit inside the defined subspace.

According to one embodiment, a computer-implemented method is provided. The method may include receiving an input defining a subspace of a 3D spatial map of a real-world space. The method may further include filtering a set of 3D models to identify a subset of the 3D models that fit within the subspace defined by the input. The method may further include outputting AR content comprising a render of a particular 3D model from the subset and overlaid onto a view of the real-world space in a position within the subspace.

In some embodiments, filtering the set of 3D models may include determining whether a 3D model will fit within the subspace based on an anchoring constraint that limits where the 3D model can be positioned within the subspace. In some embodiments, the 3D spatial map of the real-world space may be obtained from at least one sensor on a device. In some embodiments, the input may originate from a user interacting with the device. In some embodiments, the input may be obtained using movement of the device to define a boundary of the subspace where a point in a visual display of the device intersects with the 3D spatial map of the real-world space. In some embodiments, the device may comprise a touch screen display and the input may be obtained from the user interacting with the touch screen display to visually define a boundary of the subspace on top of an image of the real-world space. In some embodiments, the subspace may be a 2D space.

In some embodiments, the method may further include a step of receiving from the user a selection of a combination of 3D models from the subset, and rendering the combination of 3D models within the subspace. In some embodiments, the method may further include limiting the subset based on a particular condition, the particular condition different from whether a given 3D model fits within the subspace. In some embodiments, the particular condition may comprise at least one of whether the given 3D model is associated with an item in a user's shopping cart, whether the given 3D model is associated with a search query provided by a user, whether the given 3D model corresponds to a product that is in stock, or whether the given 3D model is complementary to another real or virtual object present in the 3D spatial map of the real-world space.

In some embodiments, the particular 3D model may be a first 3D model from the subset, and the method may further include in response to the first 3D model being rendered within the subspace: determining that a second 3D model from the subset may no longer fit within the subspace and excluding the second 3D model from the subset. In some embodiments, determining that the second 3D model no longer fits within the subspace includes determining that the second 3D model cannot both fit in the subspace and not collide with the first 3D model already rendered in the subspace. In some embodiments, determining that the second 3D model no longer fits within the subspace includes determining that the second 3D model cannot both fit in the subspace and maintain a minimum predefined distance from the first 3D model already rendered in the subspace.

In some embodiments, the particular 3D model may be a first 3D model from the subset, and the method may further include in response to modifying at least one of size, quantity, or position of the first 3D model being rendered within the subspace: determining that a second 3D model from the subset may no longer fit within the subspace and excluding the second 3D model from the subset. In some embodiments, the second 3D model is rendered within the subspace prior to the modifying, and the excluding further includes no longer rendering the second 3D model within the subspace.

A system is also disclosed that is configured to perform the methods disclosed herein. For example, the system may include a memory and at least one processor to directly perform (or instruct the system to perform) the method steps.

In another embodiment, there is provided a computer readable medium having stored thereon computer-executable instructions that, when executed by a computer, cause the computer to perform the operations of the methods disclosed herein. The computer readable medium may be non-transitory.

BRIEF DESCRIPTION OF THE DRAWINGS

Embodiments will be described, by way of example only, with reference to the accompanying figures wherein:

FIG. 4 illustrates steps of a computer-implemented method, according to an embodiment;

DETAILED DESCRIPTION

For illustrative purposes, specific example embodiments will now be explained in greater detail below in conjunction with the figures.

In an AR experience a 3D spatial map of the real-world space may encompass a volume of the real-world space that is commensurate with or larger than the real-world space viewed through the user's device. However, the user may have specific requirements that limit AR content of a 3D model to a particular subspace of the 3D spatial map of the real-world space. The user may define a subspace of a 3D spatial map of a real-world space to limit the space where the AR content is rendered. Further, the 3D models may be filtered to identify a subset of the 3D models that fit within the subspace defined by the input.

In the embodiments below examples are presented in the context of e-commerce. However, the methods and systems disclosed herein are not limited to e-commerce. There may be scenarios in which the methods and systems may be deployed that have nothing to do with e-commerce. One example may be in the context of as-built modifications and building design. For example, during construction projects the final product often differs from the planned drawings, causing spacing issues for various pieces of equipment. Being able to define the subspace where the equipment is to be placed by a render may facilitate in either finding a replacement piece of equipment that better aligns with the modified design or help in finding new subspaces where the affected equipment may be placed, for example. More generally, rendering AR content within a defined subspace may be applicable to any application where AR content is desired to be limited to a subspace.

Figure 1:
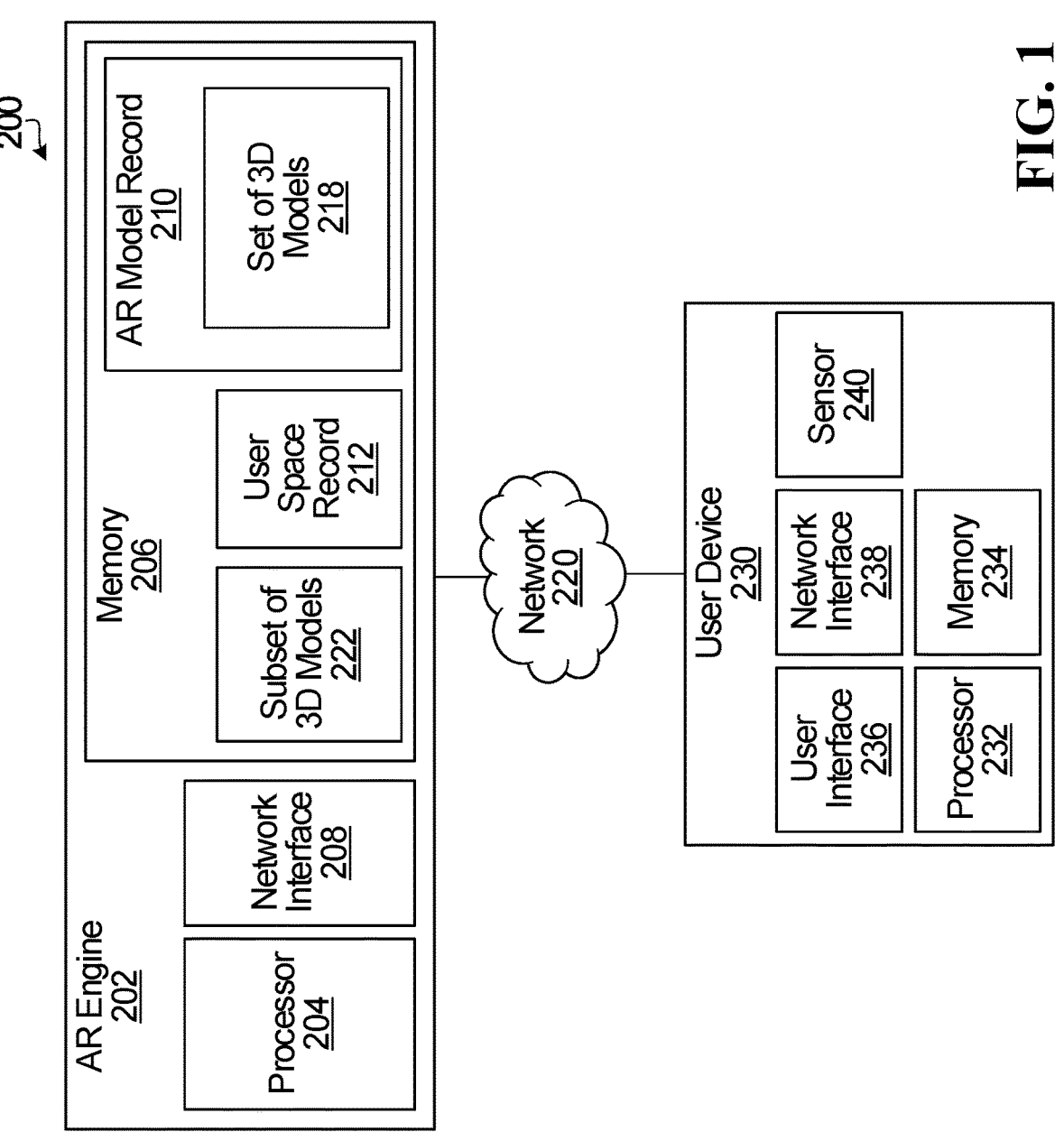
FIG. 1 is a block diagram illustrating a system for generating AR content within a subspace, according to an embodiment.

FIG. 1 is a block diagram illustrating a system 200 for generating AR content within a subspace, according to one embodiment. The system includes an AR engine 202, a network 220, and at least a user device 230.

The network 220 may be a computer network implementing wired and/or wireless connections between different devices, including the AR engine 202 and the user device 230. The network 220 may implement any communication protocol known in the art. Non-limiting examples of network 220 include a local area network (LAN), a wireless LAN, an internet protocol (IP) network, and a cellular network.

The AR engine 202 supports the generation of AR content. As illustrated, the AR engine 202 includes a processor 204, memory 206 and a network interface 208. The processor 204 may be implemented by one or more processors that execute instructions stored in the memory 206 or in another computer readable medium, where the computer readable medium may be non-transitory. Alternatively, some or all of the processor 204 may be implemented using dedicated circuitry, such as an application specific integrated circuit (ASIC), a graphics processing unit (GPU) or a programmed field programmable gate array (FPGA).

The network interface 208 is provided for communication over the network 220. The structure of the network interface 208 is implementation specific. For example, the network interface 208 may include a network interface card (NIC), a computer port (e.g., a physical outlet to which a plug or cable connects), and/or a network socket, etc., depending upon the implementation.

The memory 206 stores an AR model record 210, a user space record 212, and a subset of 3D models 222.

The AR model record 210 includes a set of 3D models 218, but the models stored in the AR model record 210 do not necessarily need to be 3D models. The AR model record 210 may, in the context of e-commerce, include models of furniture, decorations, and electronics, for example. These AR models can be implemented in an AR experience. By way of example, a user may define a subspace in an AR experience where AR models may be rendered. The AR models can then be implemented within the AR experience for the user, allowing the user to view the AR models. The set of 3D models 218 stores 3D models that may be specific to an online store, for example, and may vary along with inventory of the items available in the online store. The online store may be an online marketplace.

A 3D model is a mathematical representation of a virtual entity that is defined with a length (e.g. boundary length or bounding length), a width and a height. A 3D model can be positioned or otherwise defined within a 3D virtual coordinate system, e.g. within a virtual coordinate system generated via simultaneous localization and mapping (SLAM). The virtual coordinate system may be a cartesian coordinate system, a cylindrical coordinate system or a polar coordinate system, for example. A 3D model might be anchored to the origin of the virtual coordinate system such that the 3D model is at the center of the virtual coordinate system. Alternatively, a 3D model may be anchored according to an anchoring constraint defined by a user or defined by the AR engine 202, such as a plane or point in the 3D spatial map. A 3D model may be entirely computer-generated or may be generated based on measurements of a real-world entity. Possible methods for generating 3D models from a real-world entity include photogrammetry (creating a 3D model from a series of 2D images), and 3D scanning (moving a scanner around the object to capture all angles).

The 3D models in the AR model record 210 and the set of 3D models 218 could be obtained in any of a number of different ways. In some embodiments, at least some of the 3D models are obtained from a user of the AR engine 202, such as from a customer or a merchant, for example. A merchant could generate 3D models for any, one, some or all of the products sold in their stores. These 3D models may be provided directly to the AR engine 202 by the merchant, or the AR engine 202 may obtain the 3D models from a merchant's account on an e-commerce platform and/or from the merchant's online store. 3D models may also or instead be obtained from other platforms such as social media platforms, 3D modeling platform websites or online databases, for example. In addition, some 3D models may be generated locally at the AR engine 202. For example, images or scans that are obtained by the AR engine 202 can be used to generate a 3D model.

A 3D model allows an object to be viewed at various different angles in an AR experience. Further, when a user is viewing AR content using a device with 3D capabilities (such as a headset, for example), the 3D model allows for 3D representations of the object to be generated and included in the AR content. For example, 3D representations of an object might be achieved by displaying slightly different perspectives of the object in each eye of a user, giving the object a 3D effect.

The user space record 212 stores representations of real-world spaces. A representation of a real-world space can define a real-world environment that may be overlaid with AR content. An example of a representation of a real-world space may be a 3D spatial map of a real-world space that may be generated by a SLAM process. A representation of a real-world space could be user-specific. For example, a representation of a real-world space could be obtained from and/or generated specifically for a particular user. Alternatively, a representation of a real-world space could be obtained from a stored representation of a real-world space stored in the user space record 212.

The user space record 212 may also store subspaces defined within a representation of a real-world space. A subspace could be user-specific or real-world-specific. For example, a user-specific subspace may be defined in the representation of the real-world space by the user interacting with a device. A real-world-specific subspace may, for example, be determined by the processor 204 and limited by objects, items and/or any other properties of the real-world space associated with the representation of the real-world space. The subspaces may provide a defined area where AR content is to be provided.

A 3D spatial map generally provides spatial information pertaining to the features of the space, including the boundaries of the space (for example, the walls of a room) and the objects within the space (for example, the structures and people in a room). The spatial information can identify any, some or all of the features in the space, and provide the position (including the location and orientation) and the dimensions of the features in the space. Non-limiting examples of such features include the surfaces, edges and corners in the space. In other words, the 3D spatial map may provide a topographical map, layout, or model of the space in 3D.

In some cases, a 3D spatial map of a real-world space corresponds to a real-world room, building, area or other physical environment. For example, a 3D spatial map of a real-world space can include, or be generated from, measurements captured by a user device. These measurements may include one or more optical images, radar scans, lidar scans and/or sonar scans of the space, for example. The 3D spatial map of the real-world space can be continuously or intermittently updated as new measurements are received. In some embodiments, a 3D spatial map of a real-world space can be generated by a SLAM process.

The subset of 3D models 222 stores a filtered subset of the set of 3D models 218. The subset of 3D models 222 may include 3D models that fit within a subspace stored on the user space record 212. The processor 204 may obtain the dimensions and/or volumes of the 3D models and a subspace to then determine whether each 3D model of the set of 3D models 218 may fit with the subspace. The subset of 3D models 222 may store a subset for each subspace stored in the user space record 212. The subset associated with a subspace may also be updated as the user modifies an aspect of the subspace, or the set of 3D models is updated. For example, the subspace may be increased resulting in additional 3D models to be included in the subset of models 222. In another example, the online store may have no more of an item in stock causing the 3D model of the item to be removed from the set of 3D models 218 and further removed from the subset of 3D models 222.

The processor 204 may analyse images received and/or stored by the AR engine 202. In some embodiments, the processor 204 is used to generate a 3D spatial map of a real-world space based on one or more images of the real-world space. Image analysis can detect the features of the real-world space, including the surfaces, edges and/or corners of the real-world space. Image analysis can also determine the dimensions and relative positions of these features of the real-world space in 3D. The representation of the real-world space can then be generated based on the size, shape and position of the features, and optionally be stored in the user space record 212.

In some embodiments, the processor 204 may be used to generate 3D models of objects through photogrammetry, for example. These 3D models can be stored in the AR model record 210. The processor 204 may also be used to identify suitable models to be rendered within the defined subspace based on properties of objects in the real-world space.

More than one image could be input into the processor 204 at a time. For example, multiple images of a real-world space taken from different positions could allow for the determination of a broader and more accurate representation of the real-world space. The multiple images could be obtained from a video stream or from multiple different cameras, for example. In cases where the processor 204 receives a video stream for a real-world space, the processor 204 could perform an initial feature detection operation to locate the features of the real-world space. These features could then be tracked in subsequent images received from the video stream in real-time. New features that are detected in the subsequent images could be added to the representation of the real-world space to expand the representation of the real-world space.

The image analysis may be implemented in the form of software instructions that are executable by the processor 204. Any of a number of different algorithms could be executed by the AR engine 202. Non-limiting examples of such algorithms include:

Surface, corner and/or edge detection algorithms;
Object recognition algorithms;
Motion detection algorithms; and
Image segmentation algorithms.

Figure 12:
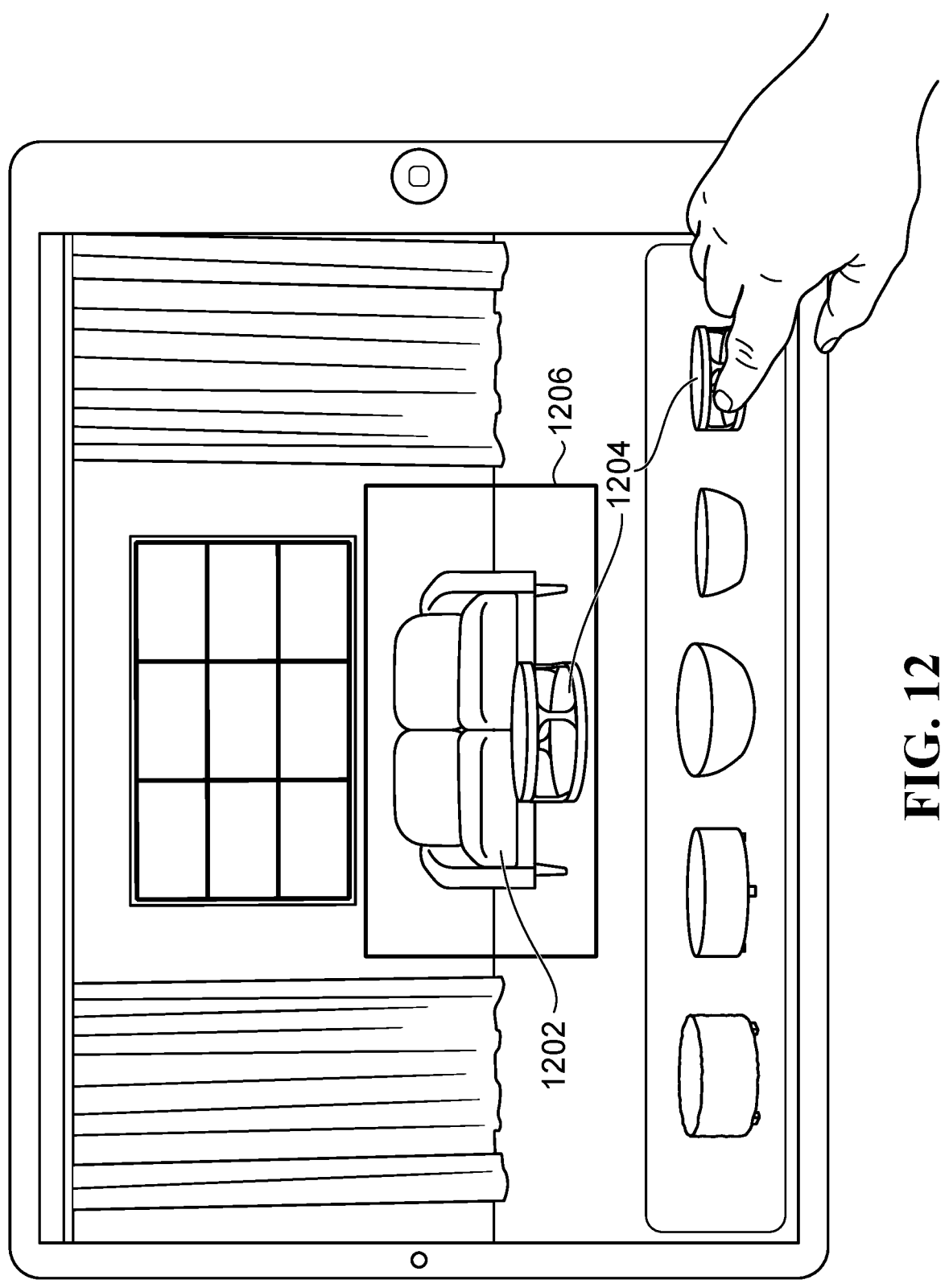
FIGS. 12 and 13 illustrate examples of updating the render within the subspace.

The AR content may be generated by the processor 204 employing and/or implementing one or more algorithms that are capable of generating AR content for the user. This AR content could form the basis of AR content that is generated within the subspace in an AR experience. Non-limiting examples of AR content include:

virtual representations of one or more objects, such as the virtual representation of the sectional 1202 and coffee table 1204 described later in relation to FIG. 12;
virtual representations of user interaction, such as the virtual representation of the interaction between the user and the sectional 1202 described later in relation to FIG. 13.

To generate AR content for a particular user, possible inputs to the processor 204 include:

One or more 3D models defined within a virtual coordinate system. The 3D models may be obtained from the AR model record 210, for example.
A representation of a real-world or virtual space associated with a user. The representation of the space may be obtained from the user space record 212, for example.
An anchor point for the virtual coordinate system within the representation of the space to map the virtual coordinate system to the space. The anchor point may be received from a user device, for example.
A location of the user within the virtual coordinate system, determined by an AR engine, for example.
A location of one or more other users within the virtual coordinate system, determined by an AR engine, for example.
A location of one or more user interactions within the virtual coordinate system, determined by an AR engine, for example.

The AR content output by the processor 204 can include visual content. Visual content can allow a user to view virtual objects within an AR experience. In some embodiments, visual content is generated based on the position (including a location and/or orientation) of the user within a virtual coordinate system of the AR experience. For example, visual content for a user can depict an object based on the relative position of the user to a model of the object in the virtual coordinate system.

Consider an example of AR content that is generated for a particular user in an AR experience. The virtual content could include visual content depicting an object in the AR experience. The size and position of the object depicted in the visual content may correspond to the position of a user relative to the object in a virtual coordinate system of the AR experience.

AR content can be continuously or intermittently updated by the processor 204 to reflect changes and/or modifications in an AR experience. If a user moves within a virtual coordinate system of the AR experience, then new AR content can be generated to reflect the new position of the user within the virtual coordinate system. For example, when the user moves relative to a 3D model in the virtual coordinate system, then the size and orientation of a render of the model can change accordingly.

The AR content is overlaid onto a real-world space surrounding the user, providing the user with the AR experience. This can include overlaying the AR content on an image of the real-world space captured by a camera, for example. In some embodiments, the AR content can be overlaid onto the real-world space using a transparent display. The AR content can be generated based on a representation of the real-world space that is stored in the user space record 212.

AR content that is generated by the AR engine 202 can be output to the user device 230 via network 220. As such, the user device 230 can enable users to engage with an AR experience. Non-limiting examples of user device 230 include a mobile phone, tablet, laptop, projector, headset, glasses, and computer. In some embodiments, the user device 230 may be a customer device that is owned and/or operated by a customer or a merchant device that is owned and/or operated by a merchant, for example. In some embodiments, the user device 230 includes implanted devices or wearable devices, such as a device embedded in clothing material or a device that is worn by a user such as glasses, with built-in displays allowing a user to view the real-world and simultaneously view AR content that is overlaid on the real-world.

The user device 230 includes a processor 232, memory 234, user interface 236, network interface 238 and sensor 240.

The user interface 236 can include, for example, a display screen (which may be a touch screen), a gesture recognition system, a speaker, headphones, a microphone, a keyboard, and/or a mouse. The user interface 236 may be at least partially implemented by wearable devices embedded in clothing and/or accessories, for example. The user interface 236 can present AR content to a user. The network interface 238 is provided for communicating over the network 220. The structure of the network interface 238 will depend on how the user device 230 interfaces with the network 220. For example, if the user device 230 is a mobile phone, headset, wearable device, or tablet, then the network interface 238 may include a transmitter/receiver with an antenna to send and receive wireless transmissions to/from the network 220. If the user device is a personal computer connected to the network with a network cable, then the network interface 238 may include, for example, a NIC, a computer port, and/or a network socket. The processor 232 directly performs or instructs all of the operations performed by the user device 230. Examples of these operations include processing user inputs received from the user interface 236, preparing information for transmission over the network 220, processing data received over the network 220, and instructing a display screen to display information. The processor 232 may be implemented by one or more processors that execute instructions stored in the memory 234 or in another computer readable medium, where the computer readable medium may be non-transitory. Alternatively, some or all of the processor 232 may be implemented using dedicated circuitry, such as an ASIC, a GPU, or a programmed FPGA.

The sensor 240 is provided to obtain measurements of the real-world environment surrounding the user device 230. These measurements can be used to generate representations of real-world spaces and/or 3D models of objects, for example. The representations of the real-world spaces may be stored in the user space record 212 and the 3D models of objects may be stored in the AR model record 210.

The sensor 240 may include one or more imaging sensors (e.g. cameras), and/or one or more radar sensors, and/or one or more lidar sensors, and/or one or more sonar sensors, and/or one or more gyro sensors, and/or one or more accelerometers, for example. In the case of a camera, the captured images may be processed by the processor 204. Measurements obtained from a radar sensor, lidar sensor, sonar sensor, gyro sensor, and/or accelerometer can also be processed by the AR engine 202. Although the sensor 240 is shown as a component of the user device 230, the sensor 240 may also or instead be implemented separately from the user device 230 and may communicate with the user device 230 and/or the AR engine 202 via wired and/or wireless connections, for example.

In some embodiments, the user device 230 has AR capabilities. For example, AR engine 202 could instead be implemented in part or in whole on the user device 230. A software application or instance may be installed on the user device 230 that generates virtual content locally (i.e., on the user device 230). The software application may receive the AR model record 210, the subset of 3D models 222, and the user space record 212 from the AR engine 202.

The AR engine 202 is provided by way of example. Other embodiments of an AR engine are also contemplated. In some embodiments, an AR engine is provided at least in part by an e-commerce platform, either as a core function of the e-commerce platform or as an application or service supported by or communicating with the e-commerce platform. In some embodiments, an AR engine is implemented at least in part by a user device, such as a customer device or a merchant device. In some embodiments, an AR engine is implemented as a stand-alone service to generate AR content. While the AR engine 202 is shown as a single component, an AR engine could instead be provided by multiple different components that are in communication via a network.

Filtering 3D Models

Figure 2:
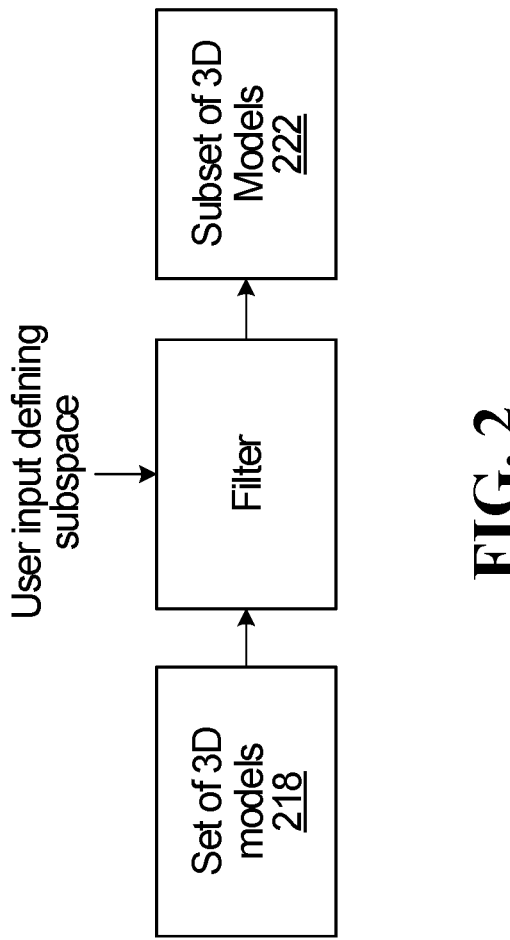
FIG. 2 is a flow diagram illustrating a method of filtering a set of 3D models, according to an embodiment.

FIG. 2 is a flow diagram illustrating a method of filtering a set of 3D models, according to one embodiment. The user input may define a subspace of a 3D spatial map of a real-world space, which will be described in more detail later. However, having the input originate from a user is not necessary. The input may instead originate from the AR engine 202, e.g. based on a rule, constraint, or condition. In any case, the input may be used to filter the set of 3D models 218 to obtain the subset of 3D models 222.

Figure 3:
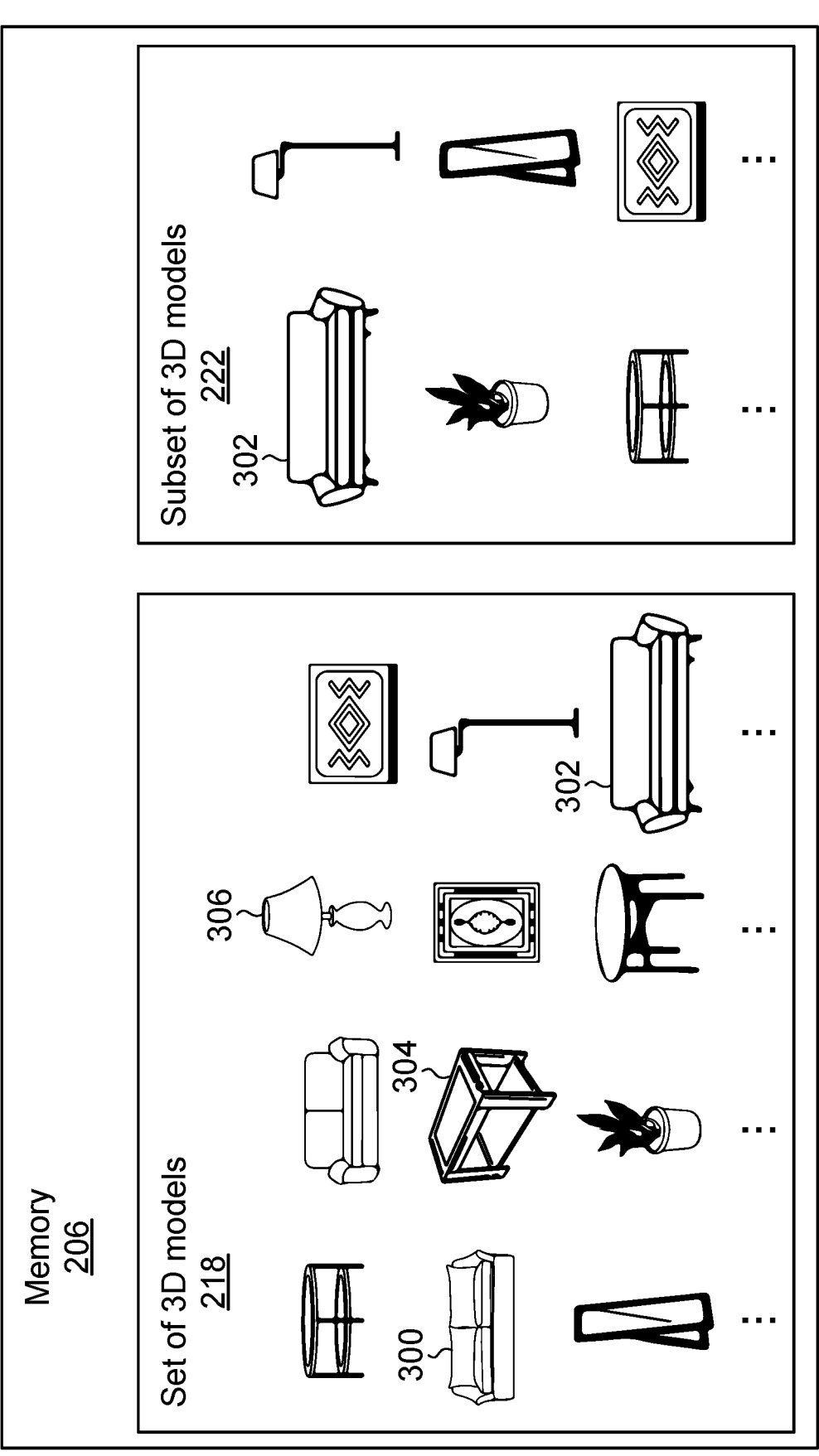
FIG. 3 illustrates an example of 3D models being filtered in the method of filtering a set of 3D models of FIG. 2.

FIG. 3 illustrates an example of 3D models being filtered in the method of filtering a set of 3D models of FIG. 2. The example is in the context of an e-commerce platform providing furniture. More generally, the set of 3D models 218 may be any set within the AR model record 210 depending on the context.

The set of 3D models 218 may include various pieces of furniture, for example, sofas 300, 302, a coffee table 304 and a lamp 306. Filtering the set of 3D models 218 may result in all the 3D models to be excluded from the subset of 3D models 222 if they do not fit within the defined subspace. However, in the example of FIG. 3 only some of the 3D models are excluded from the subset of 3D models 222, such as the sofa 300, the coffee table 304 and the lamp 306 as these do not fit within the subspace.

The subset of 3D models 222 may be the 3D models that are available to be rendered within the subspace. The AR engine 202 may select a particular 3D model to be rendered within the subspace, or the particular 3D model may be selected by the user. In another example, a combination of 3D models may be rendered within the subspace. In another example, the user may modify the render causing the subset of 3D models 222 to be further limited.

FIG. 4 illustrates a computer-implemented method 400 of generating AR content within a subspace, according to one embodiment. Not all of the steps in the method 400 of FIG. 4 are necessary in all embodiments. Also, some of the steps may be substituted by other steps instead. The method 400 will be described as being performed by the AR engine 202 of FIG. 1. However, at least a portion of or all of the method 400 could instead be performed elsewhere, such as at the user device 230, for example.

Step 402 is an optional step that includes initiating the AR experience based on instructions received from the user device 230. The AR experience could be initiated in any of a number of different ways, e.g. possibly in response to user input at the user interface 236 of the user device 230, such as a user opening up an AR application.

Figure 5:
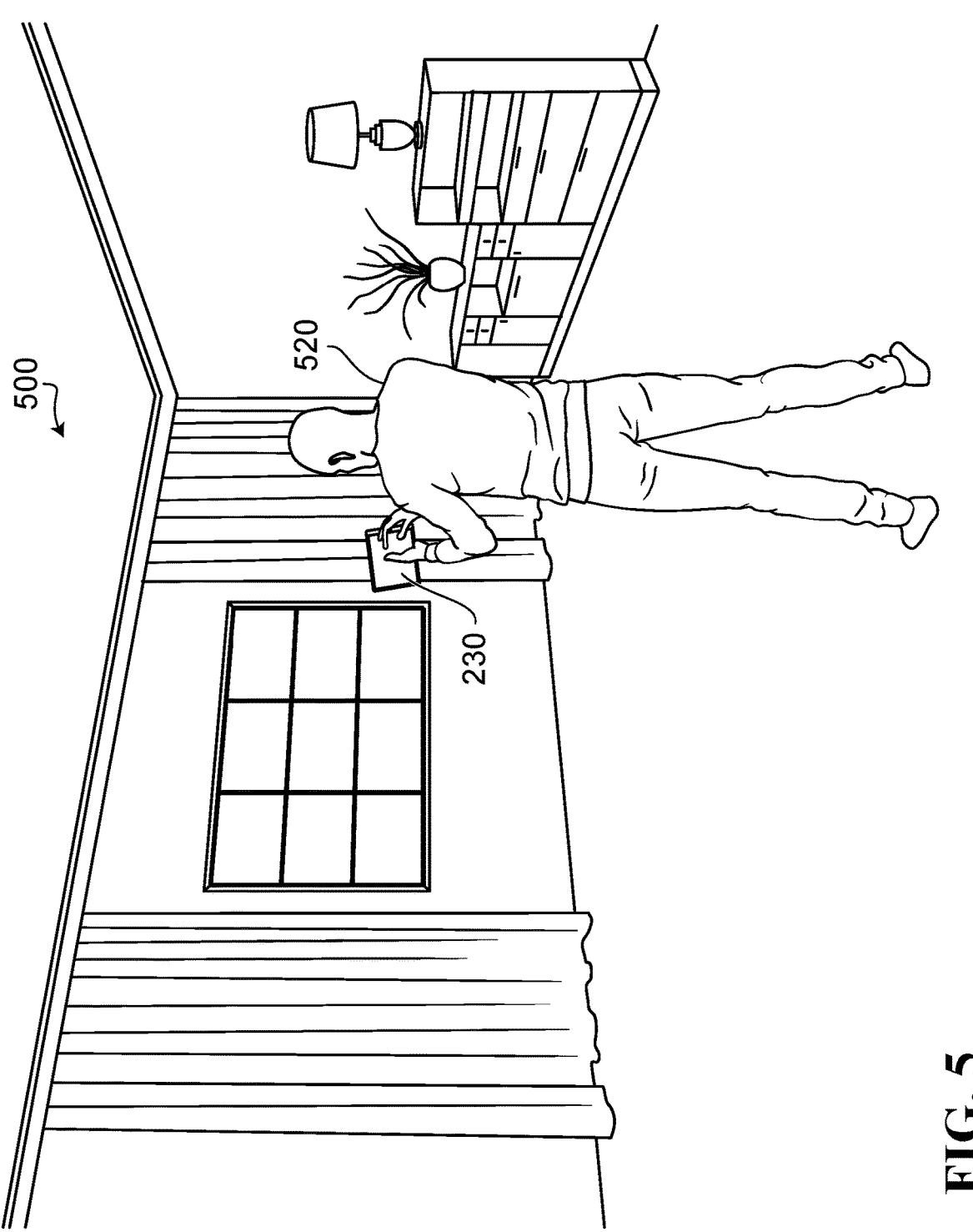
FIG. 5 illustrates an example of a user with a device generating a 3D spatial map of the real-world space, according to an embodiment.

Step 404 is an optional step where the processor 204 generates the 3D spatial map of the real-world space. The 3D spatial map of the real-world space may be generated from measurement of the real-world obtained from the user device 230. In the example shown in FIG. 5, the user 520 may be standing within the real-world space 500 holding the user device 230 and scanning the room to obtain measurements of the real-world space 500. The sensor 240 is provided to obtain measurements of the real-world space 500 surrounding the user device 230. For example, the sensor 240 may be a camera and/or another sensor. These measurements may be shared with the processor 204 over the network 220 to generate a representation of the real-world space 500. The 3D spatial map of the real-world space 500 may be stored in the user space record 212 and may be generated by a SLAM process.

In some embodiments, the SLAM process may generally proceed as follows to generate a 3D spatial map of the real-world space 500. The processor 204 of AR engine 202 may first collect and process data from sensor 240, such as from the rear-facing camera of user device 230. To improve accuracy, user device 230 may include other sensors such as an accelerometer, gyroscope, light sensor, depth sensor, etc. and the data from the rear-facing camera may be combined with data from one or more of these sensors. The AR engine 202 may then identify key feature points from the collected data. A feature point may be a distinctive location in an image, for example an image of the real-world space 500 captured by the rear-facing camera of user device 230. For example, a group of feature points which share the same planar surface may be recognized as being a surface such as the floor or wall. The AR engine 202 may perform calculations to estimate the feature points' relation in space, as well as the location of the user device 230 with relation to the feature points. Based on the calculations and estimations, the SLAM process may be used to generate a virtual map of the real-world space 500 around the user device 230. Through SLAM, a representation of the real-world space 500 surrounding the user device 230 and the position of the user device 230 within that real-world space 500 can be continuously or intermittently determined by AR engine 202 to determine and maintain the 3D spatial map of the real-world space 500. Algorithms used to perform the SLAM process may be stored in memory 206 of AR engine 202.

In some embodiments, the 3D spatial map of the real-world space 500 may be obtained from the user space record 212. For example, the user may have already generated the 3D spatial map of the real-world space 500 in a previous AR experience. In another example, the real-world space 500 may be part of a room where a contractor makes available for download the 3D spatial map of the real-world space 500 on an online website, for example.

Figure 6:
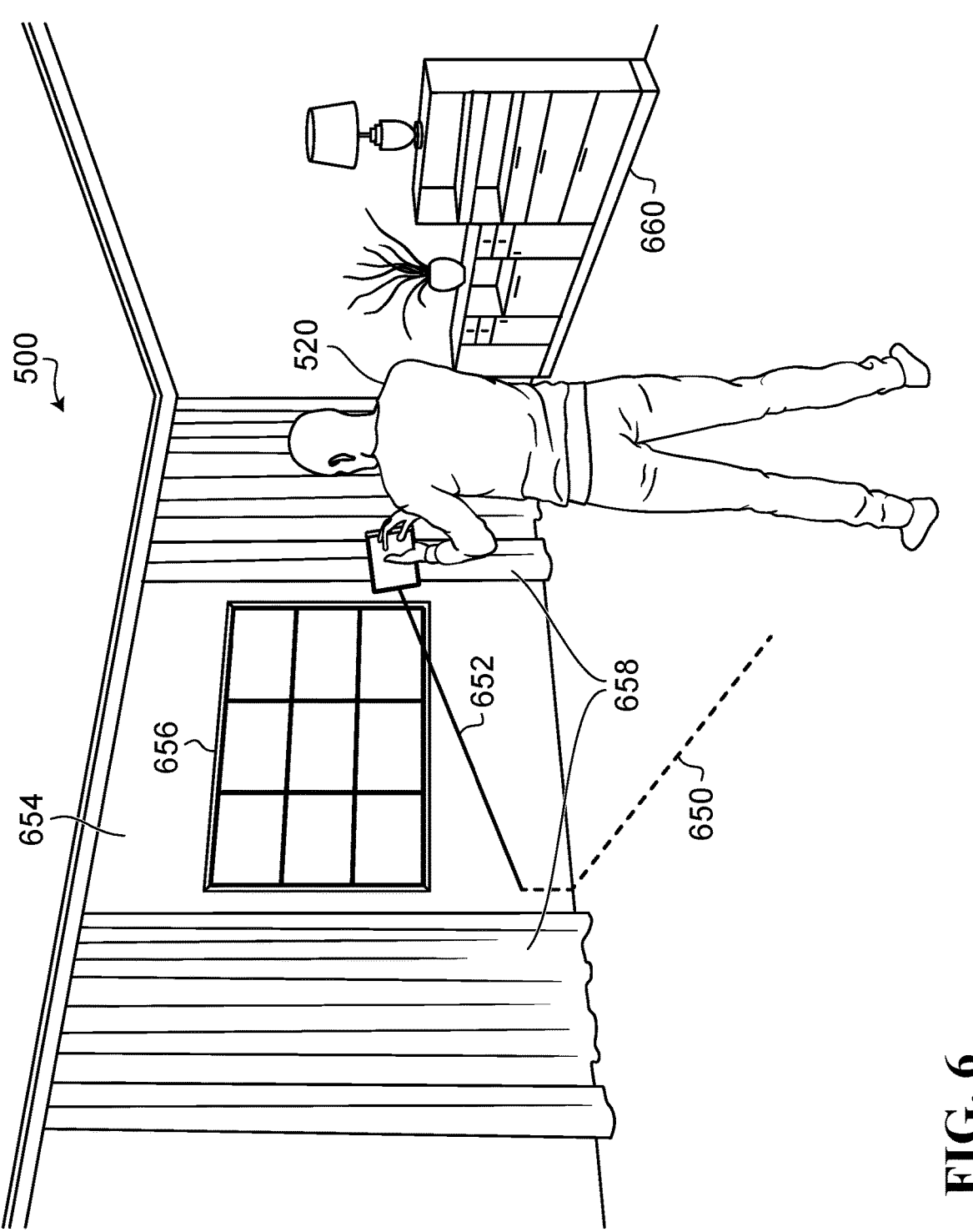
FIGS. 6 and 7 illustrates examples of a user defining a subspace.
Figure 7:
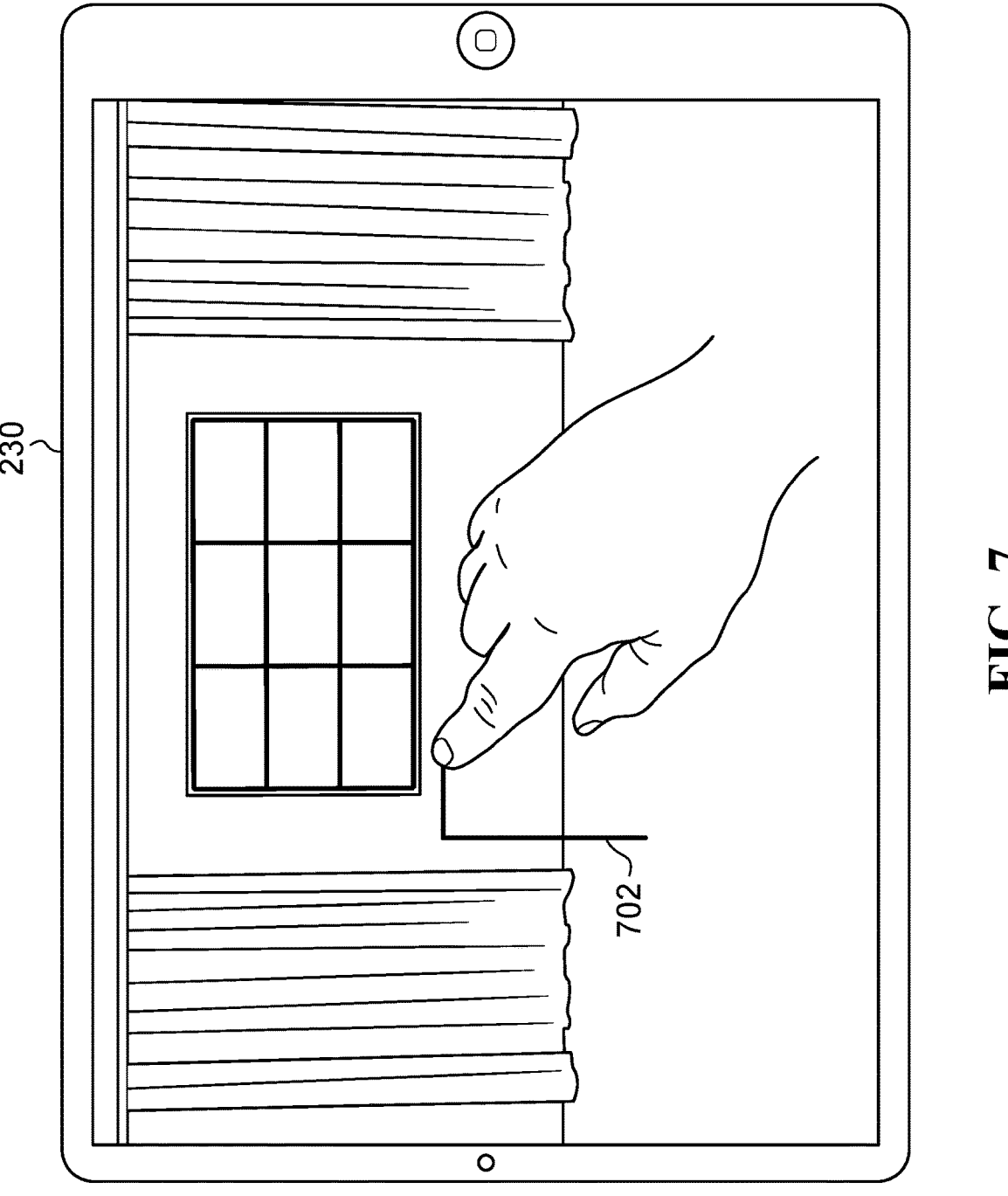

At step 406, the processor 204 receives an input defining a subspace of a 3D spatial map of a real-world space. FIGS. 6 and 7 illustrate alternative example methods of step 406. In the first example method shown in FIG. 6, the input is obtained using movement of the device 230 to define a boundary 650 of the subspace where a point in a visual display (not shown) of the device 230 intersects with the 3D spatial map of the real-world space. This method may be referred to as raycasting. A ray 652 is shown in FIG. 6 to assist in visually representing the point on the screen used to determine the point of intersection in the raycasting, but it is understood that no visually represented ray is required to define the boundary 650. The processor 204 may track the points of intersection in the 3D spatial map of the real-world space and the point on the visual display of the device 230. The points of intersection may be stored in memory 206.

FIG. 7 is a second example method of step 406, where the user interacting with the touch screen display of the device 230 visually defines a boundary 702 of the subspace on top of an image of the real-world space. The user may define the boundary by sliding their fingers, for example, along the touch screen display of the device 230. The processor 204 may then determine the points of intersection between the boundary 702 and the 3D spatial map of a real-world space so as to map the boundary in the 3D spatial map to determine the subspace dimensions. The points of intersection may be stored in memory 206. Where the device 230 is a wearable device, the point of intersection may be where the tip of a finger of the user intersects with the 3D spatial map in the view of the wearable device. In another example, the user device 230 may display a box or other shape on the screen that the user can then manipulate (e.g. via the touch screen) to change its size, shape, and/or location to define the subspace.

Figure 8:
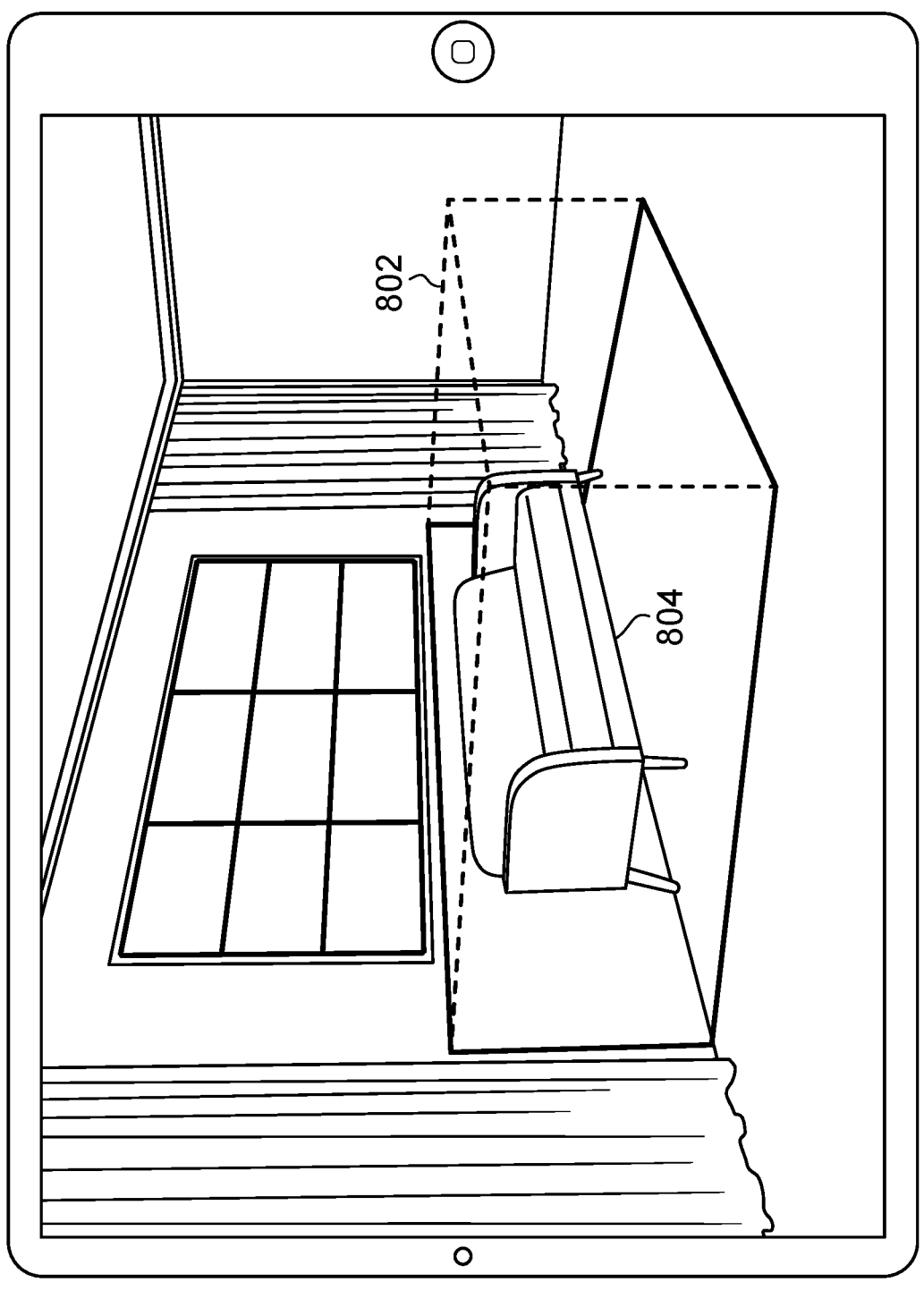
FIG. 8 illustrates an example of a 3D model rendered within the subspace.

In some embodiments, the defined subspace may be associated with a plurality of points of the 3D spatial map of the real-world space. The processor 204 may, based on the plurality of points, determine the depth, length, and height of the subspace to define a volume for the subspace 802, as shown in FIG. 8. For example, whether using raycasting (e.g. FIG. 6) or defining a boundary via a touch screen (e.g. FIG. 7) the processor 204 may detect which surfaces in the 3D spatial map are intersected along the lines of the boundary. Distance information to the boundary lines may be used to define the length width and consequently the volume of the defined subspace.

In some embodiments, the defined subspace may be a 2D subspace. The 2D subspace may be on any surface within the 3D spatial map of the real-world space. For example, referring to FIG. 6, the 2D subspace may be on the wall 654. This 2D subspace may not have a defined volume but may still have a defined area with a length and width based on the plurality of points that intersect with the 3D spatial map of the real-world space. The 2D subspace may also be used to define a projected volume. For example, the volume may be a pyramid, cone, or wedge extruding from the 2D subspace.

In some embodiments, the input defining the subspace may be provided by the AR engine 202. The processor 204 may, upon receiving from the sensor 240 the measurements of the real-world space surrounding the user device 230, detect a possible subspace, e.g. based on detected constraints, such as detected real-world objects. For example, referring to FIG. 6, the processor 204 may identify the window 656 and the curtains 658 and in response define the area below the window 656, within the curtains 658 and up to the user 520 as a possible subspace. In some embodiments, the processor 204 may use a machine learning (ML) model to define the subspace. In some embodiments, the defined subspace may then be presented to the user 520 on the user device 230 where the user 520 may accept, reject or modify the detected subspace.

The user 520 and/or the processor 204 may define multiple subspaces within the 3D spatial map of a real-world space. The multiple subspaces may be distinct from each other, have some overlap or be completely contained within each other. In one example, with reference to FIG. 8, a first subspace may be subspace 802 and a second subspace (not shown) may be completely contained within the first subspace as to only contain the sofa 804.

In some embodiments, the input defining the subspace may be a subspace stored in the user space record 212. The user may search the user space record 212 for a previously defined subspace that corresponds to a desired subspace. In some embodiments, the user may obtain a subspace, without having to interact with the touch screen display to visually define a boundary of the subspace or move the device 230 to define a boundary of the subspace where a point in the visual display of the device intersects with the 3D spatial map of the real-world space. Once a previously defined subspace is chosen, in some embodiments the user may modify and/or adjust its properties to obtain the desired shape. Alternatively, where the AR engine 202 provides the input defining the subspace, the processor 204 may search the user space record 212 for a previously defined subspace to be presented to the user on the user device 230, and in some embodiments the user may accept, reject or modify the subspace.

Now returning to the method 400 of FIG. 4 at step 408, after obtaining the input defining a subspace of a 3D spatial map of a real-world space, the processor 204 filters a set of 3D models to identify a subset of the 3D models that fit within the subspace defined by the input. The processor 204 may, as shown in FIG. 2, filter the set of 3D models 218 that fit within the input defining the subspace to obtain a subset of 3D models 222.

Filtering the set of 3D models 218 may comprise, for each 3D model of the set determining whether the 3D model will fit within the subspace defined by the input, and including the 3D model in the subset of 3D models 222 in response to the 3D model fitting within the subspace. As explained above, FIG. 3, provides an illustration of filtering a set of 3D models 218. For example, the sofa 300 found in the set of 3D models may be too wide to fit within the defined subspace and is filtered out from the subset of 3D models 222. In another example, the sofa 302 may fit within the defined subspace and is included in the subset of 3D models 222. In another example, the 3D model may have a defined orientation. The coffee table 304 may have a predetermined orientation to be rendered with the side with the smaller length facing the device 230 in the defined subspace. When the coffee table 304 is filtered it does not fit within the defined subspace as the predetermined orientation causes a portion of the coffee table's 304 volume to be outside of the volume of the defined subspace. The coffee table 304 is filtered out of the subset of 3D models 222. In another example, a 3D model may have a rendering condition. The lamp 306 may have the condition to only be rendered on the surface of 3D models classified as tables. When filtering the lamp 306, the condition of being rendered on tables causes a portion of the volume of the lamp 306 to be outside of the volume of the defined subspace. The lamp 306 is filtered out of the subset of 3D models 222.

In some embodiments, filtering a set of 3D models to identify a subset of the 3D models that fit within the subspace may include filtering according to a condition related to combinations of 3D models. For example, a filtering condition may require that a combination of a table, a rug, and a lamp all fit within the volume of the defined subspace. The subset of 3D models 222 in the example in FIG. 3 includes combinations of 3D models that satisfy this condition and fit within the defined subspace. In another example, the condition may be imposed by a ML model, where the ML model may exclude rendered combinations of products that do not make sense, e.g. a coffee table cannot block a sofa.

Figure 9:
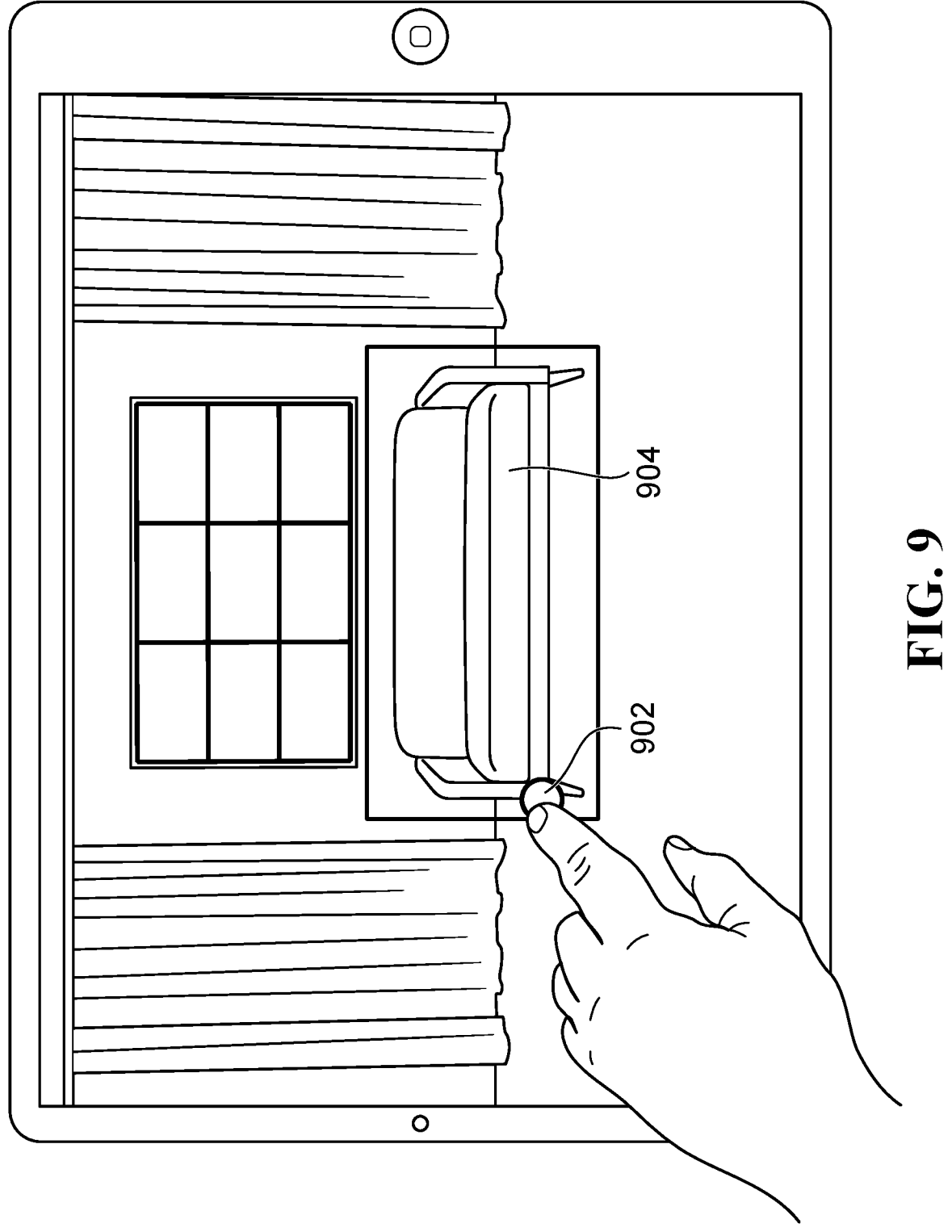
FIG. 9 illustrates a user defining an anchoring constraint, according to an embodiment.

In some embodiments, filtering the set of 3D models 218 includes determining whether a 3D model will fit within the subspace based on an anchoring constraint that limits where the 3D model can be positioned within the subspace. FIG. 9 illustrates an example of a user defining an anchoring constraint. The user may define the anchoring constraint as an anchoring point 902 at which a 3D model is to be anchored within the subspace (e.g. a point at which the corner of the 3D model 904 is to be anchored). In another example, the anchoring constraint may be a plane of the subspace or a virtual or real surface or object in the subspace. In some embodiments, an anchoring constraint might be partially or fully defined by the AR engine 202, e.g. according to a rule. One example of a rule may be: anchor the model to a detected horizontal surface at a position that is centered in the user's view. Another example of a rule may be: anchor the model in any position that satisfies the condition that the model's vertices do not intersect with the boundaries of the defined subspace or any other virtual or real objects present in the subspace. In some embodiments, the anchoring constraint might be defined in relation to other models, e.g. anchor a coffee table at least two feet in front of a rendered sofa. In some embodiments, the anchoring constraint may be defined in relation to another virtual or real object (such as an obstruction or real-life object in the subspace), e.g. anchor the model so that it does not interfere with the detected obstruction.

The anchoring constraint may dictate whether or not the model (when rendered) will fit inside the subspace. For example, if a user instructs the sofa to be positioned too close to the front of the subspace, the sofa might not fit in the subspace. As another example, if the coffee table must be positioned at least two feet away from all other furniture, the coffee table might not fit in the subspace. In some embodiments, a default position at which a model is anchored within the subspace may be subsequently modified based on user input (e.g. if the user wants to move the model from its default anchored position). If the model is moved by the user from its default anchored position, an indication may be presented to the user if the new location of the model no longer fits within the subspace or collides with another real or virtual object. For example, the rendered model may change to the color red if it is moved such that part of the rendered model falls outside of the subspace.

Figure 10:
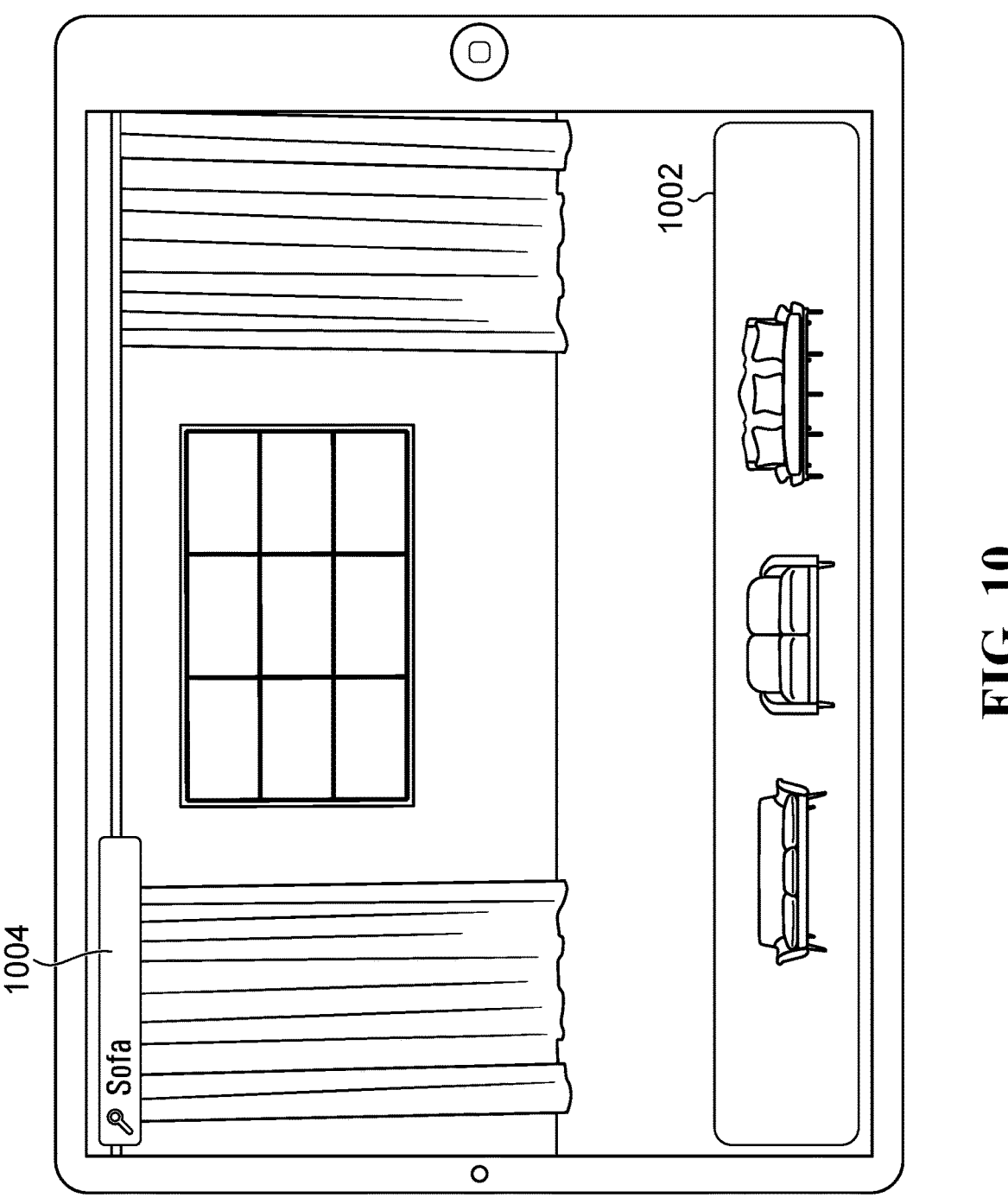
FIG. 10 illustrates an example of the set of 3D models limited by a particular condition.

In some embodiments, the subset of 3D models may be further limited based on a particular condition, the particular condition different from whether a given 3D model fits within the subspace. In some embodiments, the condition may be based on user input. For example, with reference to FIG. 10, the subset of 3D models presented to the user 1002 may be associated with a search query 1004 provided by the user, e.g. the set of 3D models 218 or filtered subset 222 only contains models associated with results of the search query 1004. In another example, the subset of 3D models may be associated with items previously viewed by a user, and/or liked by a user, and/or saved by a user, and/or in a user's shopping cart, e.g. the set of 3D models 218 or filtered subset 222 only contains models in the user's cart, or the set of 3D models 218 or filtered subset 222 only contains models associated with products on product web pages previously viewed by the user, e.g. during the browsing session. In another example, the subset of 3D models may correspond to products that are in stock, e.g. any product not in stock is eliminated from the set of 3D models 218 or the subset of 3D models 222.

In some embodiments, the subset of 3D models may be limited based on another real or virtual object present in the 3D spatial map of the real-world space. For example, with reference to FIG. 6, the cabinet 660 may cause the subset of 3D models to be limited to non-cabinet 3D models. ML and/or object detection (e.g. via computer vision) may be used to identify the cabinet 660. In another example, with reference to FIG. 8, the render of the 3D model sofa 804 may cause the subset of 3D models to be limited to non-sofa 3D models. In another example, empty volumes that are intrinsic to the 3D models themselves may limit the subset of 3D models, e.g. empty volume added to the front of the sofa for foot traffic. In another example, an obstruction within the subspace (e.g. a post) may limit the subset of 3D models.

In some embodiments, an example condition for limiting the 3D models is that the 3D models complement (or at least do not conflict with) the items in the real-world that are outside the defined subspace but still within a predetermined distance from the boundaries of the defined subspace. For example, the processor 204 may identify a coffee table located just outside the boundaries of the defined subspace. In one example, the coffee table is detected using computer vision, e.g. using a trained ML object recognition detection model. In response, a condition that the subset of 3D models 222 exclude coffee tables may be imposed, e.g. on the assumption that a user would not want a coffee table in their subspace if a coffee table is present just outside the subspace. In another example, a real or virtual coffee table may be already within the defined subspace which may cause the same condition to be imposed on the subset of 3D models 222.

Now returning to the method 400 of FIG. 4, at step 410 the AR engine 202 may output to the device 230 AR content comprising a render of a particular 3D model from the subset and overlaid onto a view of the real-world space in a position within the subspace. FIG. 8 illustrates an example of a 3D model of a sofa 804 rendered within the subspace 802.

In some embodiments, the position of the render of a particular 3D model within the subspace may be defined based on rules. For example, where the subspace includes a wall, the 3D model is rendered against the wall, as shown in FIG. 8. Where a second 3D model is rendered within the subspace, a rule may establish a minimum distance between the 3D models. As an example, if a coffee table is to be rendered in a subspace with a sofa, the rule may impose a two-foot minimum distance between the models in the subspace. These rules may be considered anchoring constraints.

Figure 11:
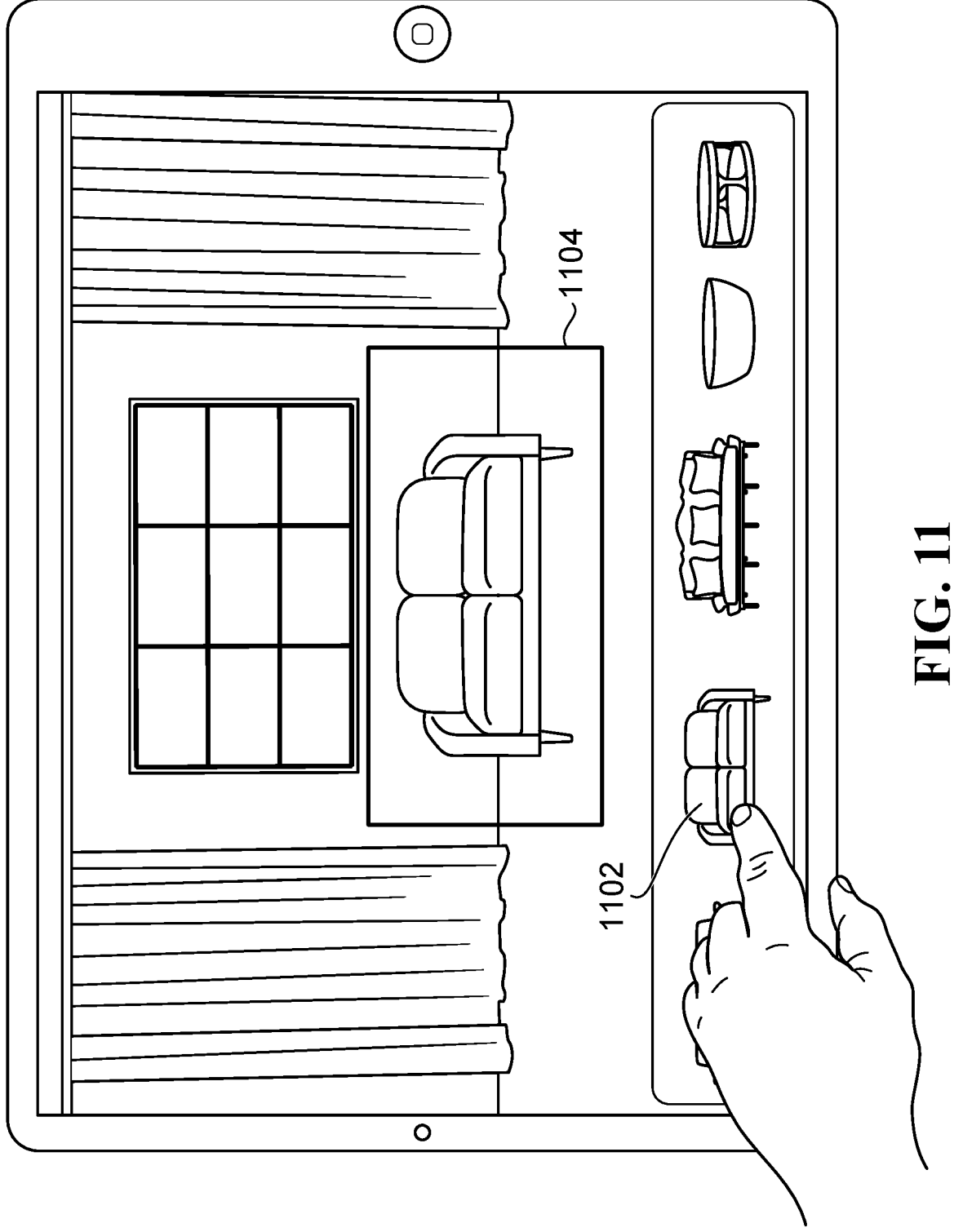
FIG. 11 illustrates an example of a user selecting a 3D model to be rendered within the subspace.

In some embodiments, the processor 204 may receive from a user a selection of the particular 3D model from the subset of 3D models to be outputted as AR content. FIG. 11 illustrates such an example. The user selects sofa 1102 which is then rendered within the subspace 1104. In another example, a user interface (UI) component (e.g. graphical UI elements) may be used to display the subset of 3D models, and the user may cycle through the subset of 3D models with the UI component. The one or multiple 3D models are then rendered in the subspace together, possibly in a default arrangement. For example, a lamp may be rendered on a table.

In some embodiments, where multiple subspaces have been defined the user may select the 3D models to be rendered in the second subspace and no longer rendered in the first subspace. Rendering the item in the second subspace may further cause the subset of 3D models to be limited in view of the properties of the second subspace. These properties may include, for example, the size of the second subspace, and/or real and/or virtual items positioned within the second subspace or positioned at a predefined distance from the second subspace.

In some embodiments, the AR engine 202 may output a render of a plurality of 3D models from the subset, the plurality of 3D models rendered within the subspace and overlaid onto the view of the real-world space. For example, as shown in FIG. 12 multiple 3D models are present within the subspace 1206.

Returning to FIG. 4, at optional step 412, the user may interact with the user device 230 to change an aspect of the render of step 410. For example, the user may add additional 3D models to be rendered within the subspace and/or may modify the size, quantity, or positions of models rendered within the subspace. For example, a user may modify at least one of size, quantity, or position of a first 3D model being rendered within the subspace which may cause the processor 204 to determine that a second 3D model from the subset will no longer fit within the subspace and excluding the second 3D model from the subset. FIGS. 12 and 13 illustrate examples of a user updating the render within the subspace. In FIG. 12 the user selects the coffee table 1204 to be rendered within the subspace 1206. The addition of the coffee table 1204 in the subspace 1206 may cause the subset of 3D models 222 to be filtered to exclude 3D models that no longer fit within the subspace with the rendered sofa 1202 and coffee table 1204. For example, a chair (not shown) may be excluded from the subset of 3D models 222 available to the user because the chair can no longer fit within the subspace now that the coffee table 1204 is rendered within the subspace. If the coffee table 1204 is subsequently removed from the subspace (no longer rendered) the chair may be added back into the subset of 3D models 222. In some embodiments, the subset of 3D models 222 may, after the addition of a 3D model in the subspace, be filtered to present to the user other 3D models that are complementary to the 3D model(s) rendered within the subspace. For example, once the coffee table 1204 is rendered within the subspace, the subset of 3D models 222 may be modified to include 3D models of objects typically found on coffee tables (e.g. candles, table plants, vases) that fit within the subspace. In some embodiments, the processor 204 may use a ML model to determine the complementary 3D models after the addition of a 3D model in the subspace. For example, the ML model may, upon receiving via the sensor 240 information about the items and area in and around the subspace, such as the color of the floor, wall, and curtains, and the light coming from the window, determine complementary 3D models that fit within the subspace to be red cushions to be placed on the sofa 1202 and white vases to be placed on the coffee table 1204.

Figure 13:
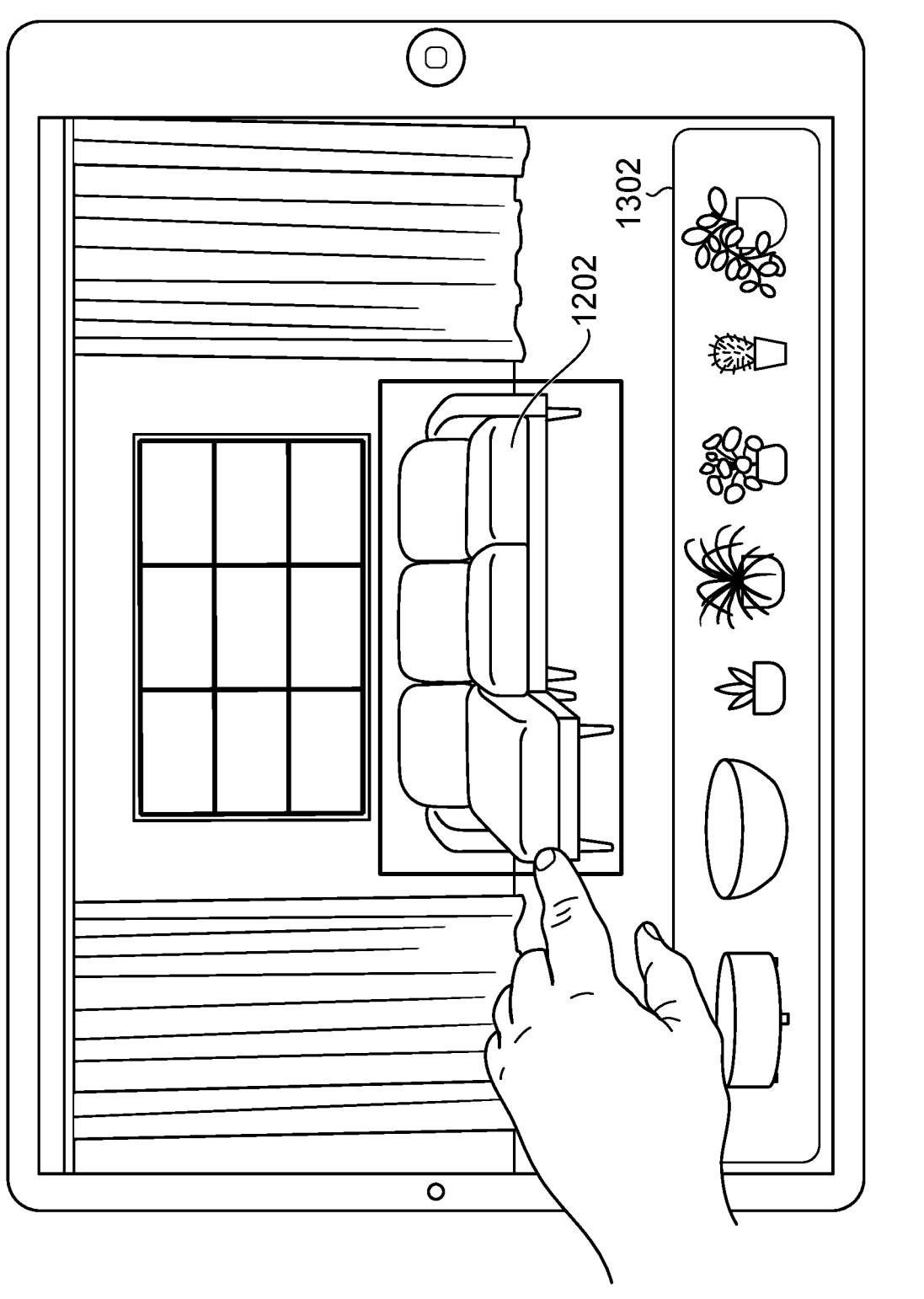

In FIG. 13, the user modifies the size of the sofa 1202. This may cause the coffee table 1204 to no longer fit within the subspace as it collides with the sofa 1202 and to be excluded from the subset of 3D models 222. In another example, modifying the size of the sofa 1202 may cause the coffee table 1204 to be excluded from the subset of 3D models as the rule of a two-foot minimum distance between the models in the subspace can no longer be adhered to. Modifying a size and/or quantity of the sofa 1202 further causes the subset of 3D models to exclude other 3D models that no longer fit within the subspace with the modified sofa 1202. As shown the subset of 3D models 222 presented to the user 1302 now includes smaller items like, for example, table plants. Larger items that were initially present in the filtered subset of 3D models 222 are no longer present because they will not fit within the subspace with the modified sofa 1202. Returning the sofa 1202 to its previous unmodified state, or removing the sofa 1202, may cause the filtered subset of 3D models 222 to again include the larger items.

In the method 400 of FIG. 4, a graphical UI element such as a menu, slider, carousel (or the functional equivalent) may be used to perform step 406, 410, and/or 412. The graphical UI element may be configured to allow the user to provide user input to perform various actions, such as: change the size of the subspace or place further limitations within the subspace; and/or scroll through a list of products having models that fit within the subspace; and/or dynamically change the size or quantity of a rendered model in the subspace (e.g. add parts to a sectional), with other rendered models in the subspace changing location as needed appropriately (or being removed if they can no longer fit in the subspace); and/or scroll between different product configurations that fit in the subspace.

In some embodiments of the method 400 of FIG. 4, combinations of models that fit in the subspace together may be recommended to the user, e.g. the user can scroll through and/or select different combinations recommended by the AR engine 202. For example, a recommended combination may be a sofa, side table, and lamp. The combination of models may be rendered according to a default anchoring constraint associated with the combination, e.g. sofa centered and placed adjacent a vertical wall, side table beside the sofa, and lamp on the side table. Models may be dynamically added to or removed from the subset of 3D models based on changing constraints (e.g. based on what is already rendered or not rendered in the subspace or based on a change in the volume of the subspace). In response, the recommended combinations may also dynamically change.

Some of the technical benefits that may arise from defining a subspace within which to render a 3D model include allowing the user to potentially limit a large set of 3D models to a smaller subset of 3D models. Limiting the set of 3D models may improve the AR experience particularly when the UI is utilized to scroll through the subset of 3D models. Further, the rendered 3D models are ensured to fit within the subspace which avoids undesirable 3D models from being shown to the user or rendered to not be entirely included within the subspace.

In terms of human-machine interaction, limiting the potential rendering to being within a subspace increases the usability of the AR experience as the user no longer has the added frustration that may occur when the 3D models default render in the centre of the 3D spatial map of the real-world space or at an undesired position. Further, the filtering of the 3D models ensures that the 3D models presented to the user will be capable of being rendered at the desired location. This avoids the situation where, for example, a 3D model may be rendered in the centre of the 3D spatial map of the real-world space but when the user tries to move the 3D model to the desired location the user discovers that the 3D model is too big to properly fit in the desired location.

In addition, by dynamically limiting the subset of 3D models the user is continuously presented with suitable models to render within the subspace. This ensures the AR experience is engaging by supporting the user in the ultimate goal of finding appropriate 3D models and arrangements to populate the desired subspace.

Computer functionality is improved by having an improved human-machine AR experience for the user in the manner explained above. Moreover, a larger database of AR models is limited to smaller database, which may result in fewer computer operations in relation to implementing subsequent searching and/or rendering because only a smaller subset of AR models are required to be handled by the software executing on the computer.

Note that although "3D models" are discussed in the embodiments herein, the models do not necessarily have to be 3D. For example, one or more 2D models may be used instead in some embodiments. Therefore, more generally, "3D models" may be substituted with "models" in embodiments herein, e.g. in relation to the steps illustrated in FIG. 4, because the models do not necessarily have to be 3D.

Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 14:
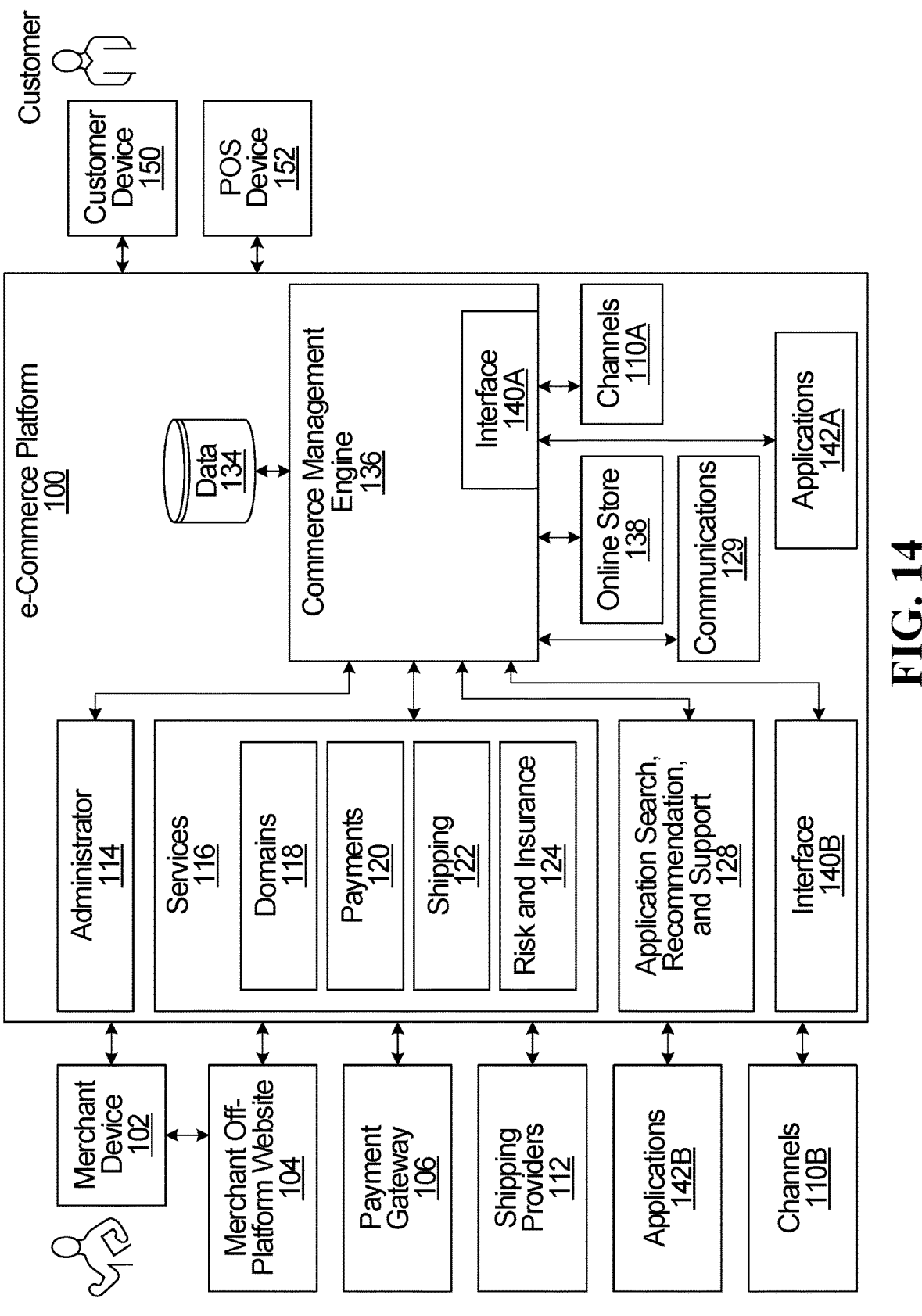
FIG. 14 is a block diagram of an e-commerce platform, according to an embodiment.

FIG. 14 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 14, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 15:
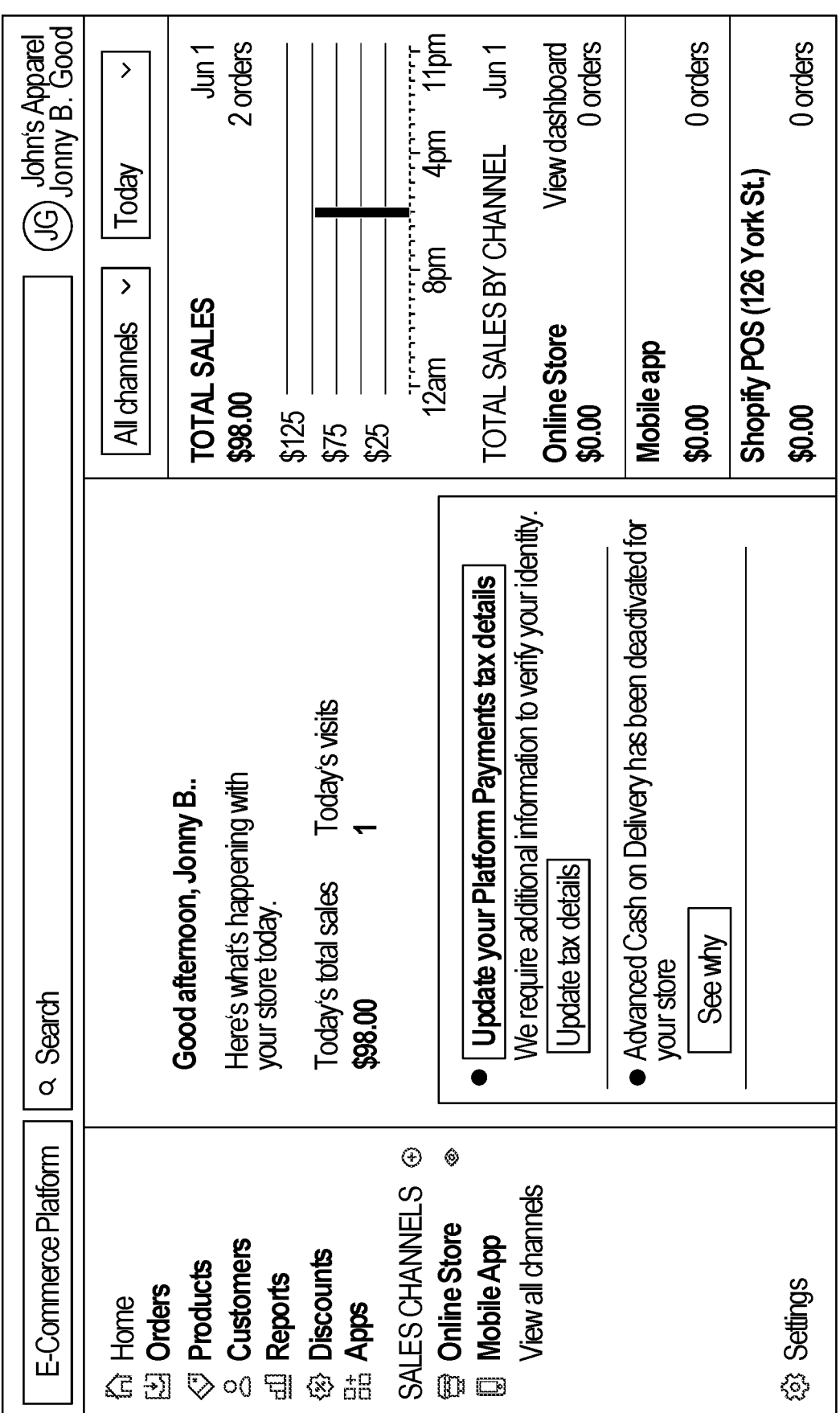
FIG. 15 illustrates a home page of an administrator, according to an embodiment.

FIG. 15 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 15. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 14, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation of Augmented Reality in an E-Commerce Platform

Figure 16:
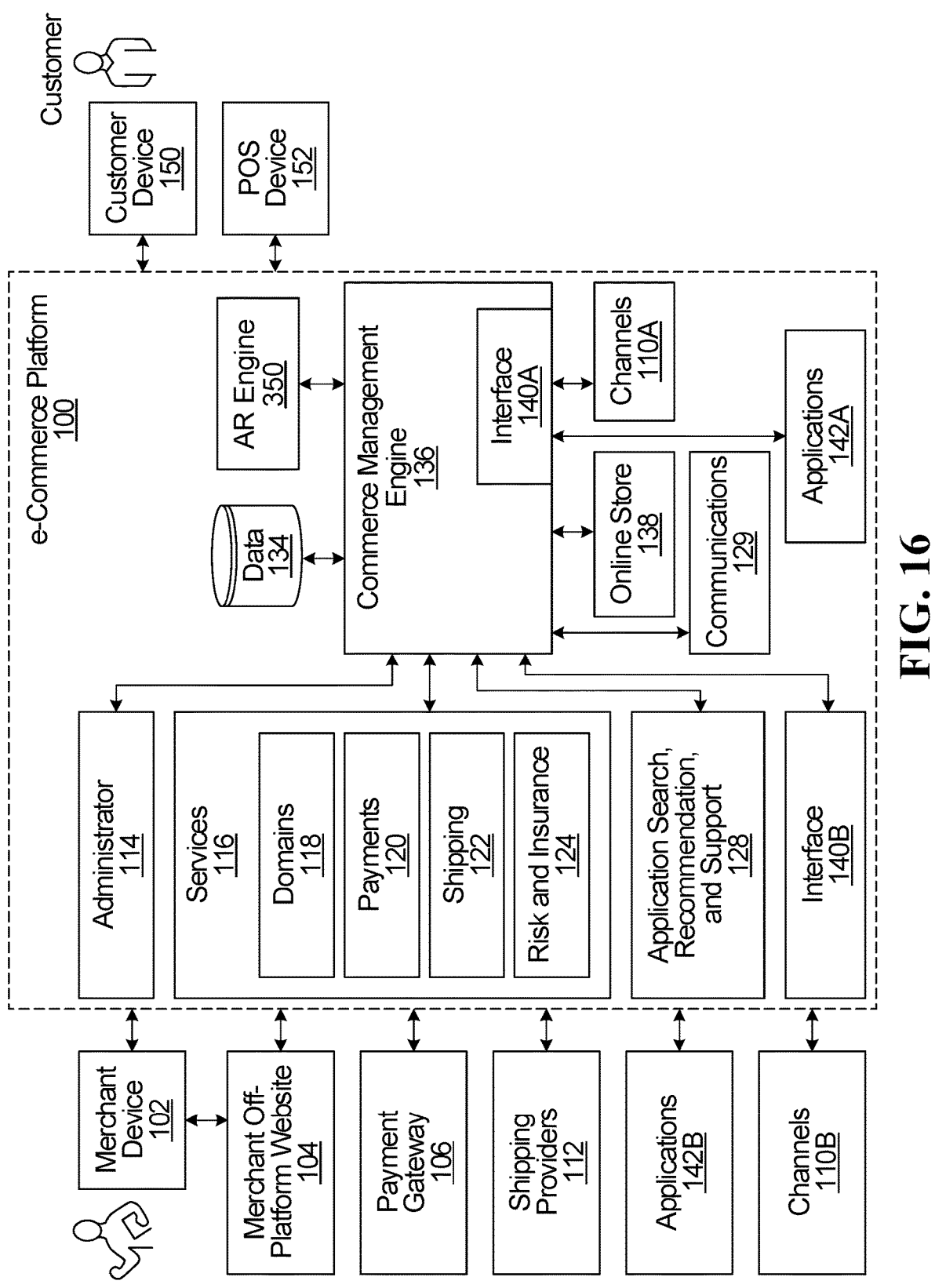
FIG. 16 illustrates the e-commerce platform of FIG. 14, but with an AR engine.

AR may be used in commerce to provide improved customer experiences. The e-commerce platform 100 may implement AR for any of a variety of different applications, examples of which are described earlier. FIG. 16 illustrates the e-commerce platform 100 of FIG. 14, but including an AR engine 350. The AR engine 350 is an example of a computer-implemented system that generates AR content for use by the e-commerce platform 100, the customer device 150 and/or the merchant device 102. In some embodiments, the AR engine 350 may be AR engine 202.

Although the AR engine 350 is illustrated as a distinct component of the e-commerce platform 100 in FIG. 16, this is only an example. An AR engine could also or instead be provided by another component residing within or external to the e-commerce platform 100. In some embodiments, either or both of the applications 142A-B provide an AR engine that is available to customers and/or to merchants. Furthermore, in some embodiments, the commerce management engine 136 provides an AR engine. The AR engine 350 may be implemented by one or more general-purpose processors that execute instructions stored in a memory. The instructions, when executed, cause the AR engine 350 to perform the operations of the AR engine 350, e.g., the operations described earlier in relation to FIG. 4. Alternatively, some or all of the AR engine 1700 may be implemented using dedicated circuitry, such as an ASIC, a GPU, or a programmed FPGA.

In some embodiments, the e-commerce platform 100 may include multiple AR engines that are provided by one or more parties. The multiple AR engines may be implemented in the same way, in similar ways and/or in distinct ways. In addition, at least a portion of an AR engine may be implemented in the merchant device 102 and/or in the customer device 150. For example, the customer device 150 may store and run an AR engine locally as a software application.

The AR engine 350 may implement at least some of the functionality described herein. Although the embodiments described herein may be implemented in association with an e-commerce platform, such as (but not limited to) the e-commerce platform 100, the embodiments described herein are not limited to the specific e-commerce platform 100 of FIGS. 14 to 16. Further, the embodiments described herein do not necessarily need to be implemented in association with or involve an e-commerce platform at all. In general, any applications of AR could implement the systems and methods disclosed herein.

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:

obtaining a 3D spatial map of a real-world space, the 3D spatial map based on measurements of the real-world space obtained using a sensor of a device in the real-world space;

receiving an input defining a subspace of the 3D spatial map of the real-world space;

filtering a set of 3D models to identify a subset of the 3D models fit within the subspace defined by the input, wherein filtering the set of 3D models includes, for each 3D model of the set of 3D models:

determining whether the 3D model will fit within the subspace based on both size of the 3D model and a point or a plane within the subspace that is an anchoring constraint limiting where the 3D model can be positioned within the subspace;

in response to determining that the 3D model will not fit within the subspace based on both size of the 3D model and the point or the plane within the subspace that is the anchoring constraint limiting where the 3D model can be positioned within the subspace, preventing the 3D model from being included in the subset of the 3D models;

transmitting an instruction to present at least some of the subset of the 3D models determined to fit within the subspace defined by the input to a display associated with the device;

receiving a selection of one of the 3D models from among the at least some of the subset presented on the display; and outputting augmented reality (AR) content for display using the device, the AR content comprising a render of the selected 3D model from the subset and overlaid onto a view of the real-world space in a position within the subspace.

2. The computer-implemented method of claim 1, wherein the input is obtained using movement of the device to define a boundary of the subspace where a point in a visual display of the device intersects with the 3D spatial map of the real-world space.

3. The computer-implemented method of claim 1, wherein:

the device comprises a touch screen display; and the input is obtained from a user interacting with the touch screen display to visually define a boundary of the subspace on top of an image of the real-world space.

4. The computer-implemented method of claim 1, wherein the subspace is a 2D space.

5. The computer-implemented method of claim 1, further comprising:

receiving from a user a selection of a combination of 3D models from the subset; and rendering the combination of 3D models within the subspace.

6. The computer-implemented method of claim 1, further comprising further limiting the subset based on a particular condition, the particular condition different from whether a given 3D model fits within the subspace.

7. The computer-implemented method of claim 6, wherein the particular condition comprises at least one of:

whether the given 3D model is associated with an item in a user's shopping cart;

whether the given 3D model is associated with a search query provided by a user;

whether the given 3D model corresponds to a product that is in stock; or whether the given 3D model is complementary to another real or virtual object present in the 3D spatial map of the real-world space.

8. The computer-implemented method of claim 1, wherein the selected 3D model is a first 3D model from the subset, and wherein the method further comprises:

in response to the first 3D model being rendered within the subspace:

determining that a second 3D model from the subset will no longer fit within the subspace and excluding the second 3D model from the subset.

9. The computer-implemented method of claim 1, wherein the selected 3D model is a first 3D model from the subset, and wherein the method further comprises:

in response to modifying at least one of size, quantity, or position of the first 3D model being rendered within the subspace: determining that a second 3D model from the subset will no longer fit within the subspace and excluding the second 3D model from the subset.

10. A system comprising:

at least one processor; and a memory storing processor-executable instructions that, when executed, cause the at least one processor to:

obtain a 3D spatial map of a real-world space, the 3D spatial map based on measurements of the real-world space obtained using a sensor of a device in the real-world space;

receive an input defining a subspace of the 3D spatial map of the real-world space;

filter a set of 3D models to identify a subset of the 3D models that fit within the subspace defined by the input, wherein the at least one processor is to filter the set of 3D models by performing operations including, for each 3D model of the set of 3D models:

determining whether the 3D model will fit within the subspace based on both size of the 3D model and a point or a plane within the subspace that is an anchoring constraint limiting where the 3D model can be positioned within the subspace;

in response to determining that the 3D model will not fit within the subspace based on both size of the 3D model and the point or the plane within the subspace that is the anchoring constraint limiting where the 3D model can be positioned within the subspace, preventing the 3D model from being included in the subset of the 3D models;

transmit an instruction to present at least some of the subset of the 3D models determined to fit within the subspace defined by the input to a display associated with the device;

receive a selection of one of the 3D models from among the at least some of the subset presented on the display; and output augmented reality (AR) content for display using the device, the AR content comprising a render of the selected 3D model from the subset and overlaid onto a view of the real-world space in a position within the subspace.

11. The system of claim 10, wherein the input is obtained using movement of the device to define a boundary of the subspace where a point in a visual display of the device intersects with the 3D spatial map of the real-world space.

12. The system of claim 10, wherein:

the device comprises a touch screen display; and the input is obtained from a user interacting with the touch screen display to visually define a boundary of the subspace on top of an image of the real-world space.

13. The system of claim 10, wherein the at least one processor is to further limit the subset based on a particular condition, the particular condition different from whether a given 3D model fits within the subspace.

14. The system of claim 10, wherein the selected 3D model is a first 3D model from the subset, and wherein the at least one processor is further to:

in response to the first 3D model being rendered within the subspace: determine that a second 3D model from the subset will no longer fit within the subspace and exclude the second 3D model from the subset.

15. The system of claim 10, wherein the selected 3D model is a first 3D model from the subset, and wherein the at least one processor is further to:

in response to modifying at least one of size, quantity, or position of the first 3D model being rendered within the subspace: determine that a second 3D model from the subset will no longer fit within the subspace and exclude the second 3D model from the subset.

16. A non-transitory computer readable medium storing computer-executable instructions that, when executed by a computer, cause the computer to perform a method comprising:

obtaining a 3D spatial map of a real-world space, the 3D spatial map based on measurements of the real-world space obtained using a sensor of a device in the real-world space;

receiving an input defining a subspace of the 3D spatial map of the real-world space;

filtering a set of 3D models to identify a subset of the 3D models that fit within the subspace defined by the input, wherein filtering the set of 3D models includes, for each 3D model of the set of 3D models:

determining whether the 3D model will fit within the subspace based on both size of the 3D model and a point or a plane within the subspace that is an anchoring constraint limiting where the 3D model can be positioned within the subspace;

in response to determining that the 3D model will not fit within the subspace based on both size of the 3D model and the point or the plane within the subspace that is the anchoring constraint limiting where the 3D model can be positioned within the subspace, preventing the 3D model from being included in the subset of the 3D models;

transmitting an instruction to present at least some of the subset of the 3D models determined to fit within the subspace defined by the input to a display associated with the device;

receiving a selection of one of the 3D models from among the at least some of the subset presented on the display; and outputting augmented reality (AR) content for display using the device, the AR content comprising a render of the selected 3D model from the subset and overlaid onto a view of the real-world space in a position within the subspace.

17. The computer-implemented method of claim 1, wherein the sensor includes one or more of an imaging sensor, a radar sensor, a lidar sensor, a sonar sensor, a gyro sensor and an accelerometer.

18. The system of claim 10, wherein the sensor includes one or more of an imaging sensor, a radar sensor, a lidar sensor, a sonar sensor, a gyro sensor and an accelerometer.

19. The non-transitory computer readable medium of claim 16, wherein the selected 3D model is a first 3D model from the subset, and wherein the method further comprises:

in response to the first 3D model being rendered within the subspace: determining that a second 3D model from the subset will no longer fit within the subspace and excluding the second 3D model from the subset.

20. The non-transitory computer readable medium of claim 16, wherein the selected 3D model is a first 3D model from the subset, and wherein the method further comprises:

in response to modifying at least one of size, quantity, or position of the first 3D model being rendered within the subspace: determining that a second 3D model from the subset will no longer fit within the subspace and excluding the second 3D model from the subset.

* * * * *